United States Patent
Mital et al.

(10) Patent No.: US 9,356,913 B2
(45) Date of Patent: May 31, 2016

(54) AUTHORIZATION OF JOINING OF TRANSFORMATION CHAIN INSTANCES

(71) Applicant: Microsoft Technology Licensing, LLC, Redmond, WA (US)

(72) Inventors: Vijay Mital, Kirkland, WA (US); Darryl Rubin, Ellensburg, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/320,187

(22) Filed: Jun. 30, 2014

(65) Prior Publication Data

US 2015/0381574 A1 Dec. 31, 2015

(51) Int. Cl.
*G06F 7/04* (2006.01)
*H04L 29/06* (2006.01)
*G06F 9/44* (2006.01)

(52) U.S. Cl.
CPC .............. *H04L 63/0414* (2013.01); *G06F 8/24* (2013.01); *H04L 63/104* (2013.01)

(58) Field of Classification Search
None
See application file for complete search history.

(56) References Cited

U.S. PATENT DOCUMENTS

| | | | |
|---|---|---|---|
| 5,748,186 A | 5/1998 | Raman | |
| 6,342,901 B1 | 1/2002 | Adler et al. | |
| 6,725,427 B2 | 4/2004 | Freeman et al. | |
| 6,768,999 B2 | 7/2004 | Prager et al. | |
| 6,778,698 B1 * | 8/2004 | Prakash | G06K 9/342 382/164 |
| 7,249,314 B2 | 7/2007 | Walker et al. | |
| 7,373,656 B2 | 5/2008 | Lang et al. | |
| 8,326,880 B2 | 12/2012 | Carson et al. | |
| 8,362,971 B1 | 1/2013 | Chatterjee et al. | |
| 8,578,280 B2 | 11/2013 | Mohan et al. | |
| 8,645,344 B2 | 2/2014 | Wang et al. | |
| 2005/0039176 A1 | 2/2005 | Fournie | |
| 2005/0097561 A1 * | 5/2005 | Schumacher | G06F 8/10 718/106 |
| 2005/0203877 A1 * | 9/2005 | Baggenstoss | G06N 5/003 |

(Continued)

FOREIGN PATENT DOCUMENTS

| | | |
|---|---|---|
| CN | 103516994 A | 1/2014 |
| EP | 0350421 | 1/1990 |
| WO | WO 03001345 | 1/2003 |

OTHER PUBLICATIONS

Suh, et al., "Chameleon: A Capability Adaptation System for Interface Virtualization", In Proceedings of the First Workshop on Virtualization in Mobile Computing, Jun. 17, 2008, pp. 18-22.

(Continued)

*Primary Examiner* — Brandon Hoffman
(74) *Attorney, Agent, or Firm* — Jessica Meyers; Aaron Hoff; Micky Minhas

(57) ABSTRACT

The authorizing of transformation chain instances of different transformation chain classes to join so as to act as a compound transformation chain instance. Class-level authorized dependencies are identified between transformation chain classes. Then, instance-level authorization is performed in accordance with one or more joining criteria, presuming that the instances are of appropriate classes that may be joined. The joining allows the instances to act as a single compound transformation chain whereby data is permitted to flow across the boundaries of the constituent transformation chain instances. New transformation chain instances may be joined to the compound transformation chain instances, and transformation chain instances may be removed from the compound transformation chain instance, thereby dynamically changing the compound application.

20 Claims, 26 Drawing Sheets

(56) References Cited

U.S. PATENT DOCUMENTS

| | | | |
|---|---|---|---|
| 2005/0289505 A1* | 12/2005 | Williams | G06F 9/485 717/103 |
| 2009/0171720 A1* | 7/2009 | Crook | G06Q 10/04 705/35 |
| 2009/0313349 A1* | 12/2009 | Jeong | H04L 63/10 709/217 |
| 2011/0060704 A1 | 3/2011 | Rubin et al. | |
| 2011/0154197 A1 | 6/2011 | Hawthorne et al. | |
| 2011/0265060 A1* | 10/2011 | Fritzsche | G06F 8/10 717/104 |
| 2012/0060100 A1 | 3/2012 | Sherwood et al. | |
| 2012/0159326 A1 | 6/2012 | Mital et al. | |
| 2012/0203747 A1 | 8/2012 | Douetteau et al. | |
| 2012/0306921 A1 | 12/2012 | Bushell et al. | |
| 2013/0050484 A1 | 2/2013 | Alberth | |
| 2013/0275615 A1 | 10/2013 | Oyman | |
| 2013/0290575 A1 | 10/2013 | Suh et al. | |
| 2013/0339351 A1 | 12/2013 | Mital et al. | |
| 2013/0344917 A1 | 12/2013 | Sobti et al. | |
| 2014/0019471 A1 | 1/2014 | Linton et al. | |
| 2014/0025650 A1 | 1/2014 | Lee et al. | |
| 2014/0123186 A1 | 5/2014 | Reisman | |
| 2015/0046363 A1 | 2/2015 | McNamara et al. | |

OTHER PUBLICATIONS

Fu, et al., "A framework for device capability on demand and virtual device user experience", In IBM Journal of Research and Development, vol. 48, Issue 5,6, Sep. 2004, pp. 635-648.

U.S. Appl. No. 14/320,030, filed Jun. 30, 2014, Mital et al.

U.S. Appl. No. 14/320,083, filed Jun. 30, 2014, Mital et al.

U.S. Appl. No. 14/320,111, filed Jun. 30, 2014, Mital et al.

Huang, et al., "A Distributed Framework for Collaborative Annotation of Streams", In Proceedings of International Symposium on Collaborative Technologies and Systems, May 18, 2009, 8 pages.

"International Search Report and Written Opinion Issued in PCT Application No. PCT/US2015/038226", Mailed Date: Oct. 6, 2015, 9 pages.

Cuadrado, et al., "A Component Model for Model Transformations", In Transactions on Software Engineering, vol. 40, Issue 11, Jul. 1, 2013, 20 oages.

"International Search Report and Written Opinion Issued in PCT Application No. PCT/US2015/038406", Mailed Date: Sep. 29, 2015, 11 Pages.

"International Search Report & Written Opinion Received for PCT Application No. PCT/US2015/038219", Mailed Date: Sep. 2, 2015, 12 Pages.

"International Search Report and Written Opinion Issued in PCT Application No. PCT/US2015/038220", Mailed Date: Sep. 28, 2015, 10 Pages.

Bader, et al., "A Context-Aware Publish-Subscribe Middleware for Distributed Smart Environments", In International Conference on Pervasive Computing and Communications Workshops, Mar. 2012, pp. 100-104.

Cugola, et al., "Towards Dynamic Reconfiguration of Distributed Publish-Subscribe Middleware", In Proceedings of the 3rd International Conference on Software Engineering and Middleware, May 20, 2002, pp. 187-202.

Gamma, et al., "Design Patterns, Elements of Reusable Object-Oriented-Software", Observer Pattern, Passage, Jan. 1, 1995, pp. 293-383.

Karenos, et al., "A Topic-Based Visualization Tool for Distributed Publish/Subscribe Messaging", In IEEE/IPSJ 11th International Symposium on Applications and the Internet, Jul. 18, 2011, pp. 65-74.

Rao, et al., "On Efficient Content Matching in Distributed Pub/Sub Systems", In Proceedings of the 28th Conference on Computer Communication, Apr. 19, 2009, pp. 756-764.

Second Written Opinion Issued in PCT Application No. PCT/US2015/038406, Mailed Date: Feb. 19, 2016, 7 Pages.

Notice of Allowance dated Mar. 3, 2016 cited in U.S. Appl. No. 14/320,030.

Second Written Opinion Issued in PCT Application No. PCT/US2015/038226, Mailed Date: Mar. 7, 2016, 4 Pages.

* cited by examiner

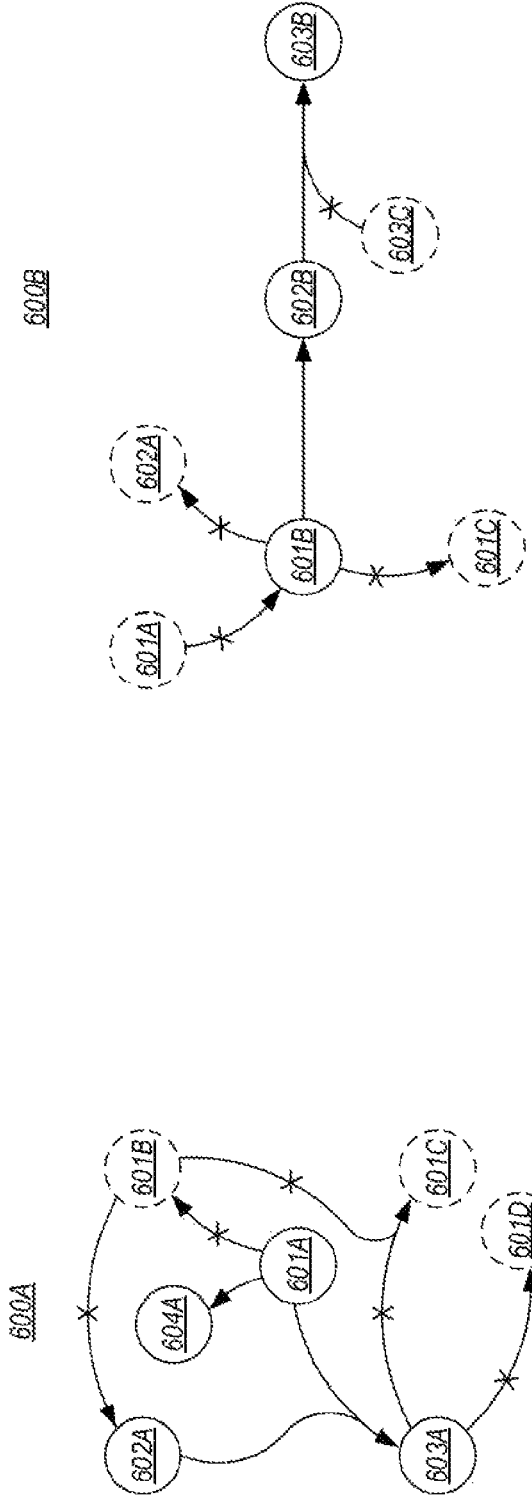
*Figure 6B*
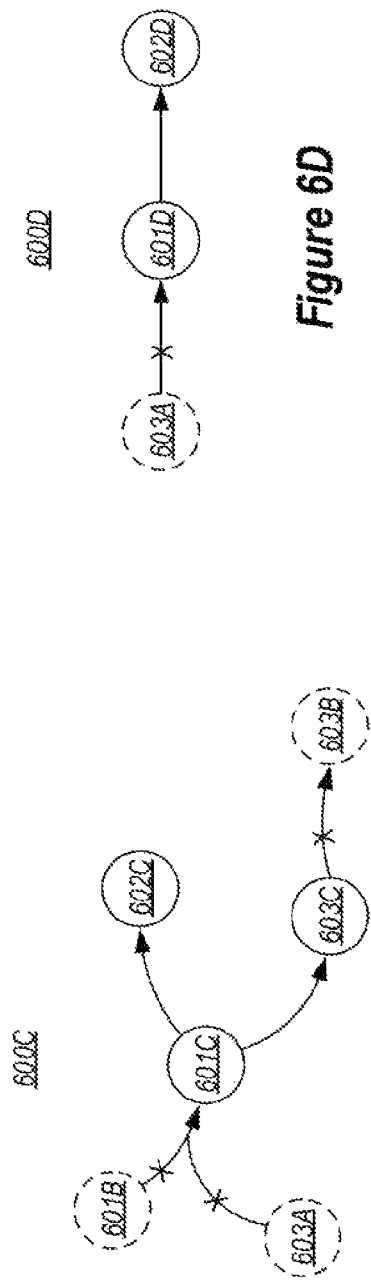
*Figure 6D*
*Figure 6C*
*Figure 6A*

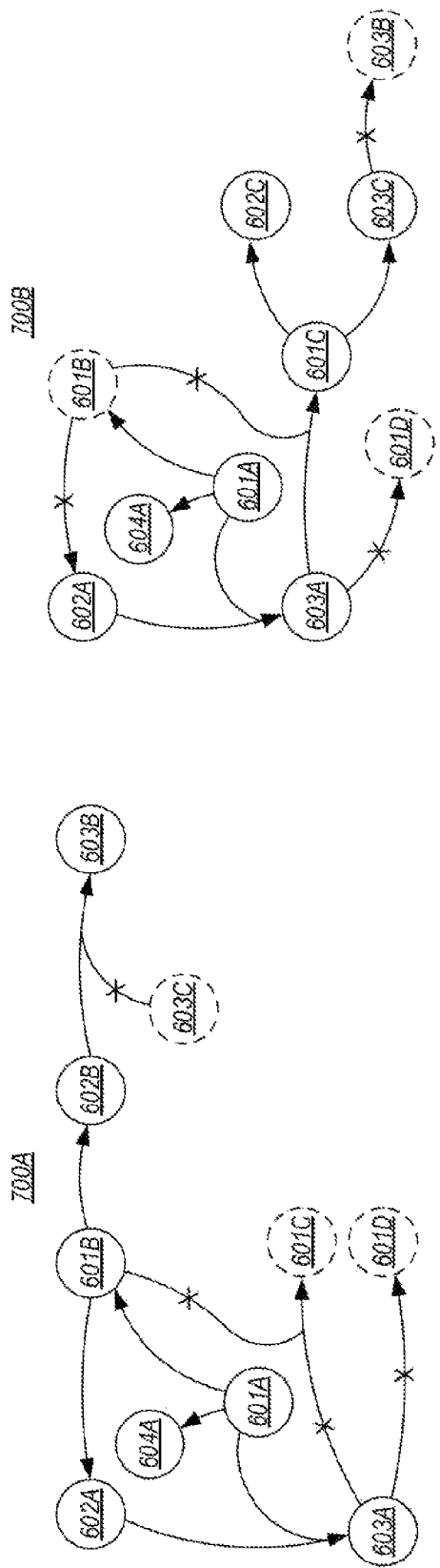
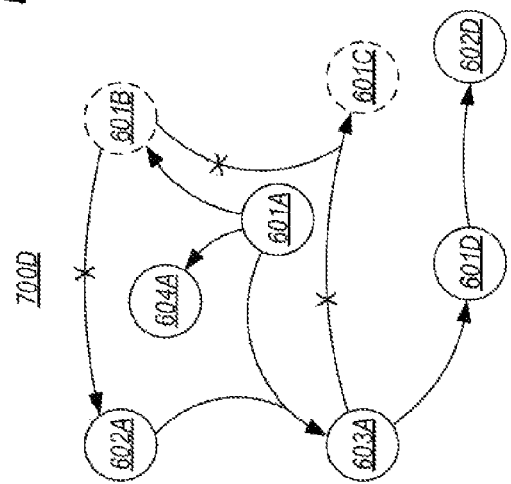
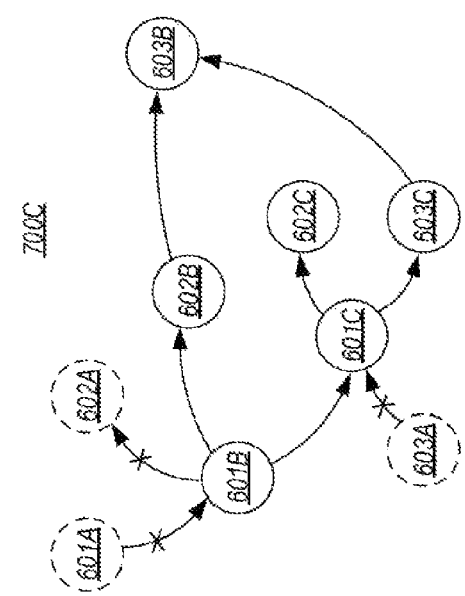
Figure 7A
Figure 7B
Figure 7C
Figure 7D

AUTHORIZATION OF JOINING OF TRANSFORMATION CHAIN INSTANCES

BACKGROUND

Computing technology has revolutionized the way we work, play, and communicate. As computing technology has advanced, so has the diversity of devices that embody such computing systems or display content from a computing system. For instance, a computing system can take the form of a server rack, a desktop computer, a laptop computer, a tablet, a smart phone, a gaming console, a watch, a refrigerator, a smart house, and the like.

Along with the diversity in computing systems, the types of devices that might be used to render computing output and input information to a computer has likewise diversified. For instance, output devices might include displays such as projectors, television monitors, three-dimensional displays, laptops, tablet computers, telephones, and the like. Output devices might include output for sound, such as speakers. Output devices might also include actuators, lights, valves, and the like. Input devices might include keyboards, pointer devices (such as a mouse), touchscreens, microphones, videos cameras, still cameras, three-dimensional position detectors, global positioning system monitors, light sensors, accelerometers, thermometers, compasses, and the like.

Computing systems and associated input and output devices have become quite prolific and often mobile. Often, in any given location, there may be a large number and wide variety of devices present. For instance, in an average conference room that is fully attended, there might be overhead projectors, television screens, laptops, tablets, smartphones, microphones, cameras, lighting, and the like. The conventional paradigm is that each device runs its own application, or displays content from a single application. When applications do interact, they interact often as separate applications interacting through an application program interface.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the authorizing of transformation chain instances of different transformation chain classes to join so as to act as a compound transformation chain instance. Class-level authorized dependencies are identified between transformation chain classes. Then, instance-level authorization is performed in accordance with one or more joining criteria, presuming that the instances are of appropriate classes that may be joined. The joining allows the instances to act as a single compound transformation chain whereby data is permitted to flow across the boundaries of the constituent transformation chain instances. New transformation chain instances may be joined to the compound transformation chain instances, and transformation chain instances may be removed from the compound transformation chain instance, thereby dynamically changing the compound application.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 6A through 6D each illustrate example transformation chains that may be associated with respective devices in FIG. 5 (arrows through which data does not flow absent joining with another transformation chain are illustrated with an "X", and dependency elements that are not nodes in the transformation chain itself are illustrated with dashed lined borders);

FIG. 7A illustrates an augmented transformation chain representing the joining of the transformation chains of FIGS. 6A and 6B;

FIG. 7B illustrates an augmented transformation chain representing the joining of the transformation chains of FIGS. 6A and 6C;

FIG. 7C illustrates an augmented transformation chain representing the joining of the transformation chains of FIGS. 6B and 6C;

FIG. 7D illustrates an augmented transformation chain representing the joining of the transformation chains of FIGS. 6A and 6D;

DETAILED DESCRIPTION

At least some embodiments described herein relate to the authorizing of transformation chain instances of different transformation chain classes to join so as to act as a compound transformation chain instance. Class-level authorized dependencies are identified between transformation chain classes. Then, instance-level authorization is performed in accordance with one or more joining criteria, presuming that the instances are of appropriate classes that may be joined. The joining allows the instances to act as a single compound transformation chain whereby data is permitted to flow across the boundaries of the constituent transformation chain instances. New transformation chain instances may be joined to the compound transformation chain instances, and transformation chain instances may be removed from the compound transformation chain instance, thereby dynamically changing the compound application.

Some introductory discussion of a computing system will be described with respect to FIG. 1. Then, the compound device application technology will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
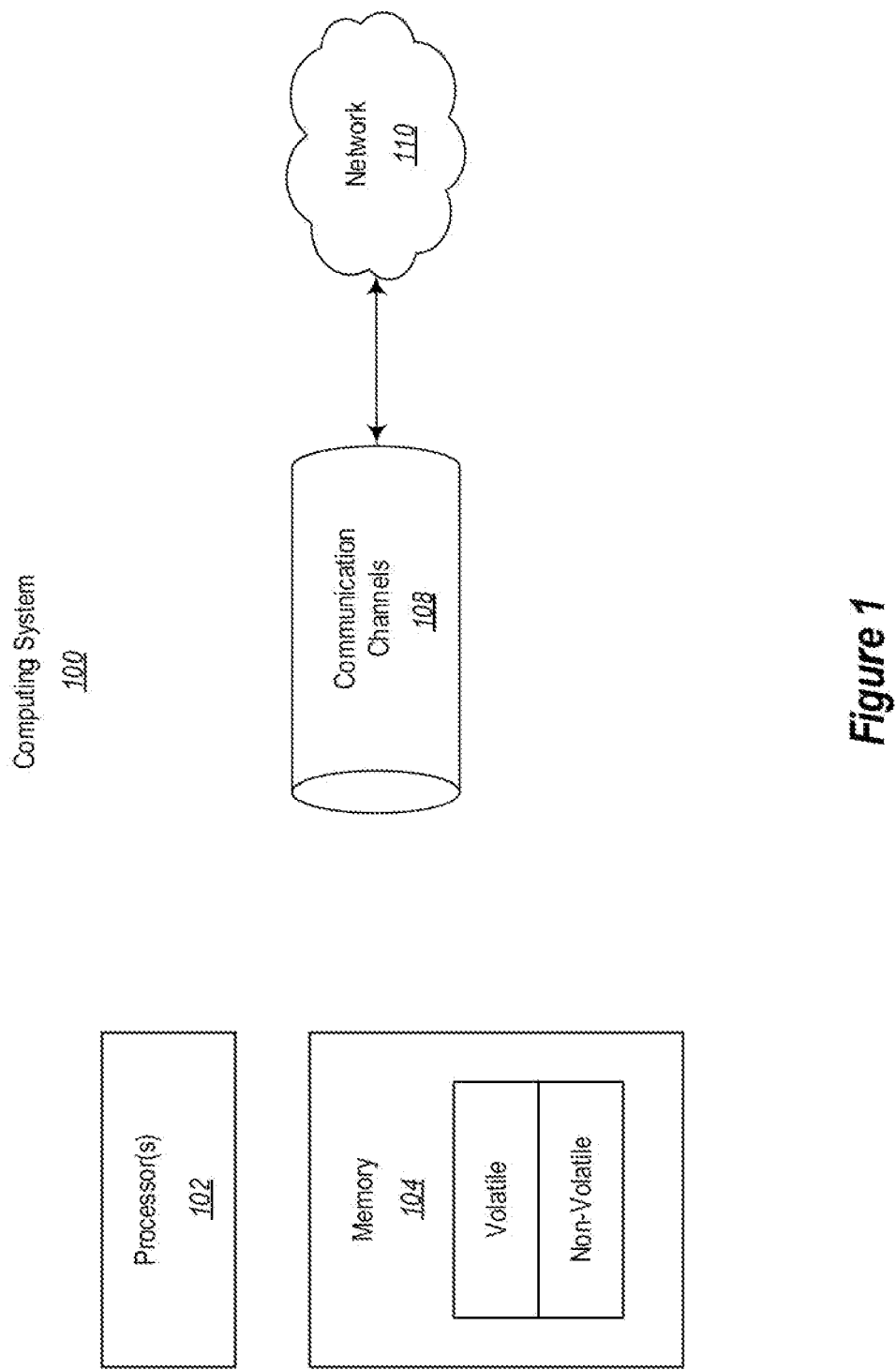
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also may potentially include output rendering components, such as displays, speakers, lights, actuators, or the like. The computing system 100 may also include input components, such as a keyboard, pointer device (such as a mouse or tracking pad), voice recognition devices, and possibly also physical sensors (e.g., thermometers, global positioning systems, light detectors, compasses, accelerometers, and so forth).

Embodiments described herein may comprise or utilize a special purpose or general purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The principles described herein operate using a transformation chain. A transformation chain is an interconnected set of nodes that each may represent data sources or data targets. There are links between the nodes, each link representing a transformation. For any given link, the associated transformation receives copies of values of one or more data sources situated at an input end to the link, and generates resulting values being provided at one or more data targets located at the output end of the link. For any given transformation, when a value at one or more of the data sources at its input end changes, the transformation is automatically reevaluated, potentially resulting in changes in value(s) of one or more data targets at the output end of the transformation.

In one embodiment, regardless of how complex the transformation chain is, the transformations may be constructed from declarative statements expressing equations, rules, constraints, simulations, or any other transformation type that may receive one or more values as input and provide resulting one or more values as output. An example of a transformation chain is a spreadsheet program, where any of the cells can be a data source or a data target. An equation (i.e., a transformation) may be associated with any cell to cause that cell to be a data target where results of the equation are placed.

Figure 2:
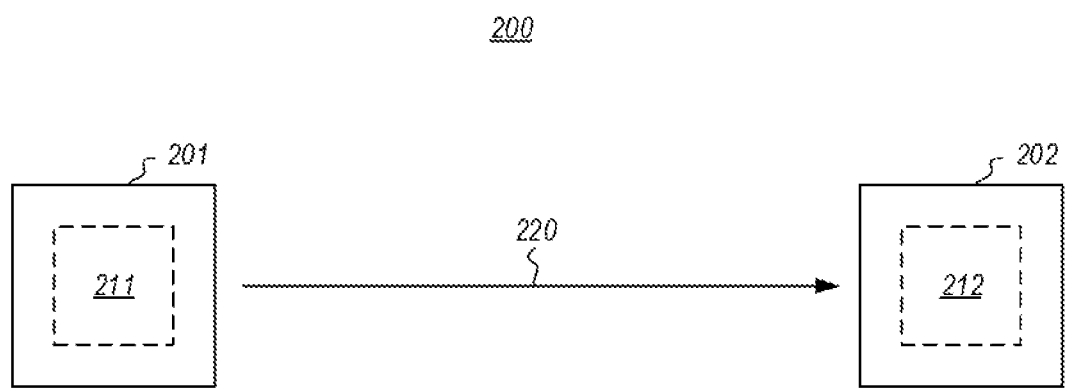
FIG. 2 abstractly illustrates a simple transformation chain in which there is but a single link coupling a single data source and a single data target and in which a transformation represented by the link is automatically performed using a value in the data source as input to generate a value in the data target.

As an example only, FIG. 2 illustrates a simple transformation chain 200 in which there is but a single link 220. In the drawing notation used throughout this description, a link will be illustrated as an arrow, with the input end being represented as the tail of the arrow, and the output end being represented as the head of the arrow. In cases in which there are multiple data sources at the input end of the link, the arrow will be represented with multiple tails. Copies of the values of the data source(s) at the tail(s) of the arrow represent input to the transformation. In cases in which there are multiple data targets affected by resulting value(s) of the transformation, the arrow will be represented with multiple heads. The values of the data target(s) at the head(s) of the arrow represent output from the transformation.

For instance, FIG. 2 illustrates a simple transformation chain 200 that includes a data source 201, a data target 202, and a single link 220. The link 220 represents a transformation performed on a copy of the value 211 at the data source 201 in order to generate a value 212 at the data target 202. Should the value 211 change, the transformation represented by link 220 is reevaluated potentially resulting in a change in the value 212 in the data target 202.

Figure 3:
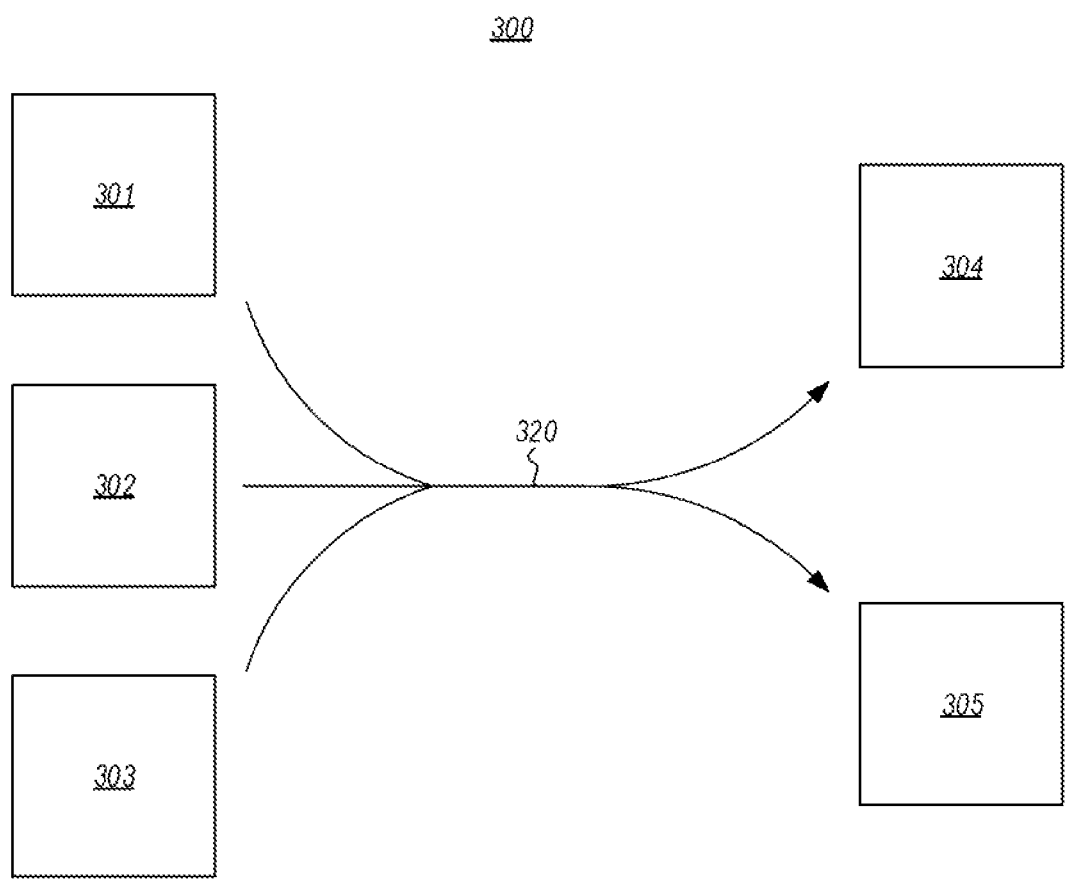
FIG. 3 abstractly illustrates another simple example transformation chain in which a transformation is performed using input values from three data sources in order to generate output values in two data targets.

FIG. 3 illustrates another simple example transformation chain 300 that includes three data sources 301, 302 and 303; two data targets 304 and 305, and a single link 320. The link 320 represents a transformation performed on copies of the values within the data sources 301, 302 and 303, in order to generate the values in the data targets 304 and 305. Should any of the values within the data sources 301, 302 or 303 change, the transformation link 320 is reevaluated potentially resulting in a change in the values within any one or more of the data targets 304 and 305.

Figure 4:
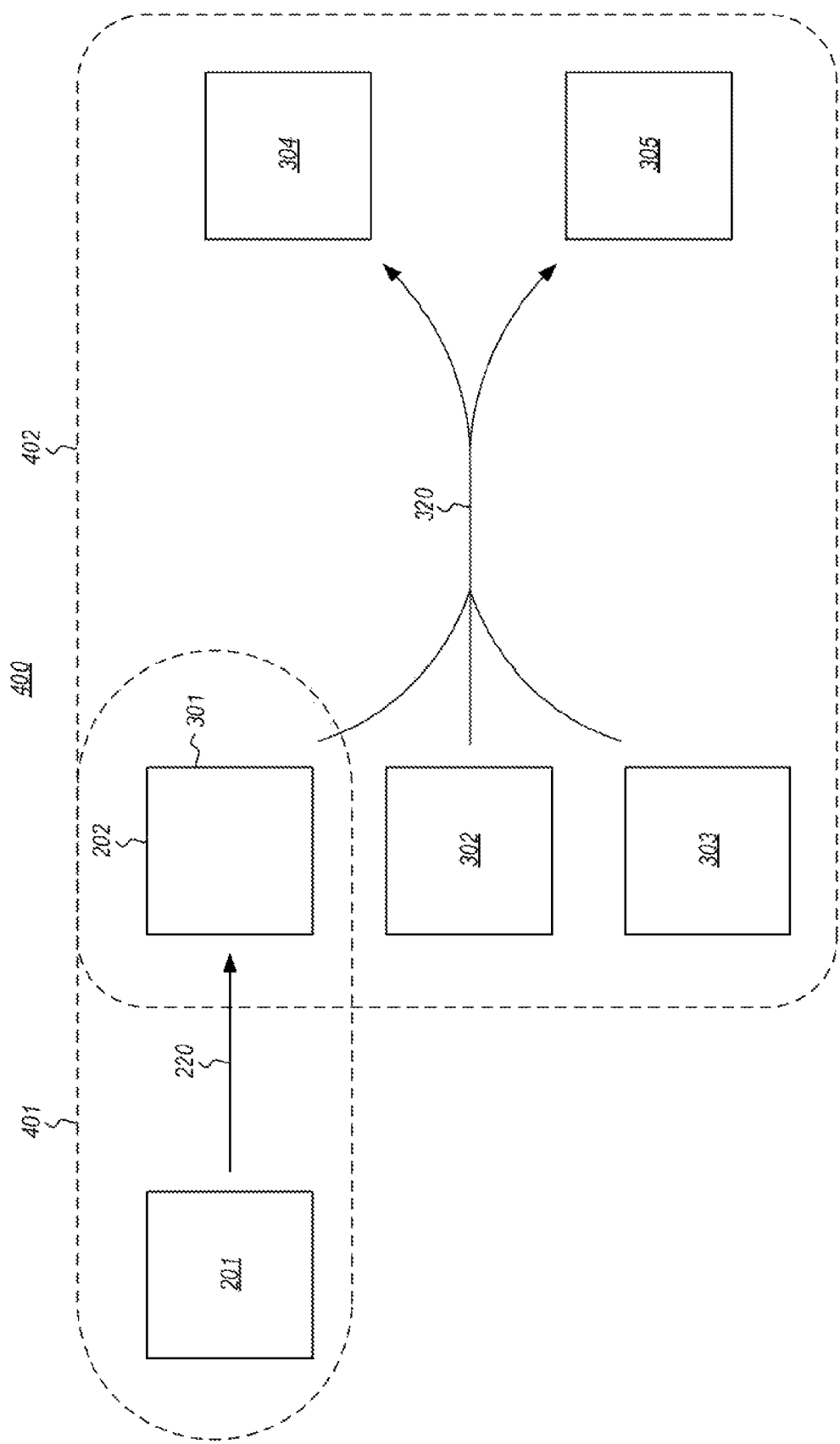
FIG. 4 illustrates a transformation chain in the form of a combination of the transformation chain of FIG. 2 and the transformation chain of FIG. 3.

FIG. 4 illustrates another example transformation chain 400, and illustrates the principle that transformation chains may build on each other in which a data source to one link may be a data target in other link, in order to create even more complicated transformation chains. For instance, the transformation chain 400 includes an instance 401 of the transformation chain 200, and an instance of 402 of the transformation chain 300. In this case, the data target 202 of the link 220 is also the data source 301 of the link 320. Should the value with the data source 201 change, the transformation represented by link 220 is reevaluated potentially resulting in a change in the value in the data target 202, which is likewise a data source 301 for the next link 320. Likewise, a change in the value of data source 301 would result in the transformation link 320 being reevaluated potentially resulting in a change in the values within any one or more of the data targets 304 and 305. Data targets 304 and 305 might likewise represent data sources for yet other links. Accordingly, in complex transformation chains, a value change might cause propagated value changes through multiple nodes in a transformation chain through proper automated reevaluation of transformations within the transformation chain.

While the example transformation chain 400 includes just two links, transformation chains may be quite complex and involve enumerable nodes and associated links connecting those enumerable nodes. The principles described herein may operate regardless of the complexity of the transformation chains.

Figure 5:
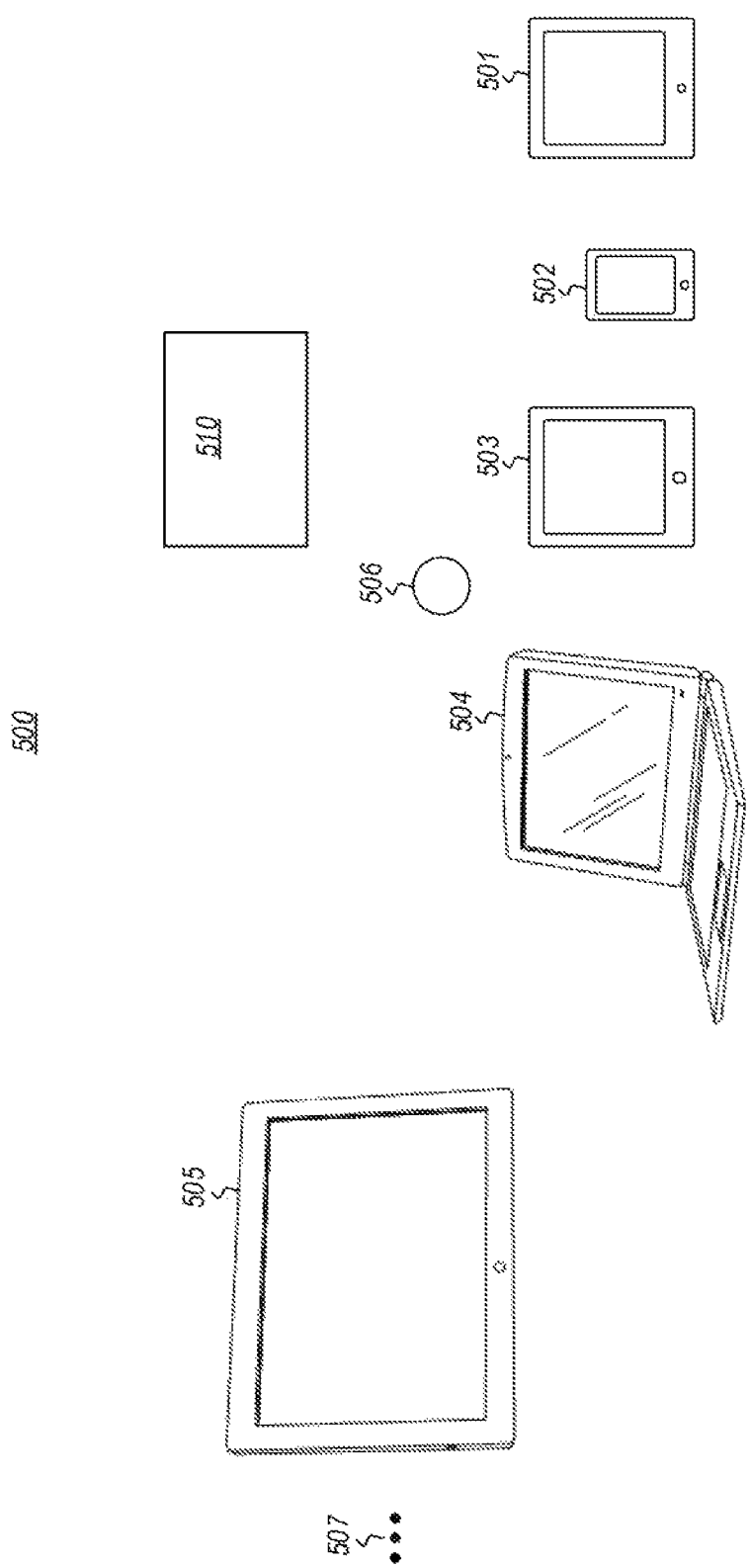
FIG. 5 illustrates an example environment in which the principles described herein may operate and which includes multiple devices associated with constituent transformation chains of a compound application, and that also includes input devices and output devices.

FIG. 5 illustrates an environment 500 in which there are six devices 501 through 506. The ellipses 507 represent flexibility in the number of devices that are present within the environment 500. In fact, there may be devices leaving and entering the environment 500 quite dynamically. Although not required, each of the devices 507 may be structured as described for the computing system 100 of FIG. 1.

The environment 500 need not be a physical environment in which all of the devices are located in the same proximity, although that might often be the case. The environment 500 may instead be thought of as any environment in which there is a set of devices through which one or more users might provide input, and multiple devices through which output may be provided to multiple users.

Some of the devices (e.g., devices 501 through 504) assist in forming what is more than just cooperating devices with cooperating applications. Instead, the devices 501 through 504 each are associated with a component of a compound application. As any of devices 501 through 504 leave the environment 500, the compound application becomes smaller, thereby resulting in changed functionality of the application. On the other hand, as devices (such as devices 501 through 504) that have components of the application enter the environment 500, the compound application actually becomes larger, thereby actually changing the functionality and very structure of the compound application. In accordance with the principles described herein, the transformation chain of one device may joined with the transformation chain of other devices, resulting in a larger transformation chain that may more effectively make use of the augmented set of devices.

The device 505 represents an output device that may be used in the environment 500, but does not necessarily contribute a transformation chain to the larger transformation chain of a compound application. For instance, the device 505 might be large screen display. The device 506 represents an input device that may be used in the environment 500, but does not necessarily contribute a transformation chain to the larger transformation chain of the compound application. For instance, the device 506 might be a microphone. The presence of devices 501 through 504 causes portions of respective associated transformations chains to be contributed to the larger transformation chain of the compound application. However, the devices 501 through 504 also may have input capability and output capability that may be used by the compound application as a whole. The environment 500 may optionally include an external system 510, which will be described further below.

FIG. 6A through 6D illustrates example transformation chains instances or classes 600A through 600D. The instances will have the same structure as the classes, and so the illustrated forms may be considered to represent transformation classes as well as transformation instances. Instances will, however, have particular instance state associated with each of one or more of the nodes of the transformation chain. Accordingly, elements 600A through 600D may be referred to as transformation chain classes or transformation chain instances. The term "transformation chain" will be used to generally refer to both transformation chain classes and their associated transformation chain instances. As an example, transformation chain instances 600A through 600D might be associated with respective devices 501 through 504.

The example transformation chains 600A through 600D are relatively simple in order to avoid obscuring the broader principles described herein with an overly complex example. That said, the principles described herein apply regardless of how complex the transformation chain, and regardless of the number of transformation chains and associated devices that are within the environment and forming the compound application.

In the notation of FIGS. 6A through 6D, the nodes that belong to the transformation class 600N (where N ranges from A through D) are represented using the suffix N. For instance, in FIG. 6A, the transformation chain 600A includes nodes 601A, 602A, 603A, and 604A. The remaining elements 601B, 601C and 601D do not end with the "A" suffix, and thus are not nodes within the transformation chain 600A. Instead, the elements 601B, 601C and 601D represent dependencies with other transformation chains.

Throughout FIGS. 6A through 6D, 7A through 7D, 8A through 8C, and 9, to emphasize those elements that are dependency elements, rather than nodes in the transformation chain itself, dependency elements are represented with dashed-lined boundaries. Data does not flow from a node to a dependency element unless the transformation chain is joined with another transformation chain that includes a node represented by the dependency element. The fact that data cannot flow along a particular transformation is represented throughout the figures by the link being marked with an "X".

For instance, element 601B in transformation chain 600A represents a dependency with node 601B in the transformation chain 600B. The dependency element 601B is bordered with dashed lines, and all links leading to or from that dependency element 601B are marked with an "X" since at this stage, the transformation chain 600A is not joined with the transformation chain 600B. Element 601C in transformation chain 600A represents a dependency with node 601C in transformation chain 600C. Element 601D in transformation chain 600A represents a dependency with node 601D in transformation chain class 600D.

On its own, the transformation chain instance 600A can function as an application. For example, the value from data source 601A may be used to form a transformed result as the value of data target 604A. Furthermore, the values from data sources 601A and 602A may be transformed to result in the value of data target 603A. If the transformation chain instance 600A is on its own, the transformations leading to and from the elements 601B, 601C and 601D are not evaluated.

The transformation chain 600B includes three nodes 601B, 602B and 603B. However, the transformation chain 600B also includes dependency elements 601A, 602A, 601C and 603C that reference a node in a different transformation chain. Again, the transformation chain instance 600B may operate independently as a single application. For example, the value from data source 601B may be provided through a transformation to generate the resulting value for data target 602B. The value from the data source 602B may be provided through a transformation to generate the resulting value for data target 603B.

Though the transformation chain instances 600A and 600B may operate independently, FIG. 7A illustrates a joined transformation chain 700A that includes transformation chain 600A joined with transformation chain 600B. Dependency elements in each of the transformation chains are now replaced with the actual node referred to. For example, dependency element 601B of FIG. 6A is now node 601B, and dependency element 601A of FIG. 6B is now node 601A. All of the nodes that have the suffix A or B are nodes within the transformation chain 700A, and only those nodes that have suffixes C or D are dependency elements. For example, nodes 601A, 602A, 603A, 604A, 601B, 602B and 603B are nodes within the augmented transformation chain 700A, and the functionality of the compound application becomes somewhat better than the sum of the functionality of the individual transformation chains 600A and 600B on their own.

The transformation chain 600C includes three nodes 601C, 602C and 603C. However, the transformation chain 600C also includes dependency elements 603A, 601B and 603B that reference a node in a different transformation chain. Again, the transformation chain instance 600C may operate independently as a single application. For example, the value from data source 601C may be provided through a transformation to generate the resulting value for data target 602C. Likewise, the value from the data source 601C may also be provided through a transformation to generate the resulting value for data target 603C.

Though transformation chain instances 600A and 600C may operate independently, FIG. 7B illustrates a joined transformation chain 700B that includes transformation chain 600A joined with transformation chain 600C. Dependency elements in each of the transformation chains are now replaced with the actual node referred to the extent that the dependency element refers to a node within any of transformation chains 600A or 600C. Now all of the nodes that have the suffix A or C are nodes within the transformation chain, and only those nodes that have suffixes B or D are dependency elements. For example, nodes 601A, 602A, 603A, 604A, 601C, 602C and 603C are nodes within the augmented transformation chain 700B. The functionality of the compound application becomes better than the sum of the functionalities of the individual transformation chain instances 600A and 600C.

FIG. 7C illustrates a joined transformation chain 700C that includes transformation chain class 600B joined with transformation chain class 600C. Dependency elements in each of the transformation chains are replaced with the actual node referred to the extent that the dependency element refers to a node within any of transformation chains 600B or 600C. Now all of the nodes that have the suffix B or C are nodes within the transformation chain, and only those nodes that have suffixes A or D are dependency elements. For instance, nodes 601B, 602B, 603B, 601C, 602C and 603C are nodes within the augmented transformation chain 700C, and the functionality of the compound application becomes better than the sum of the functionalities of the individual transformation chain instances 600B and 600C.

Figure 8B:
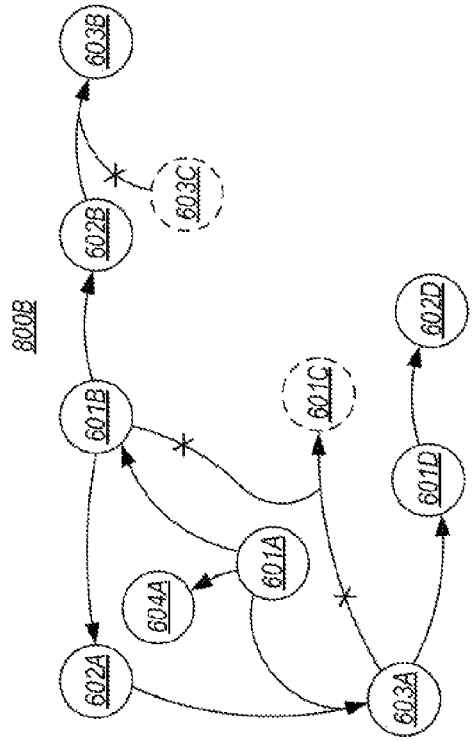
FIG. 8B illustrates an augmented transformation chain representing the joining of the transformation chains of FIGS. 6A, 6B and 6D.
Figure 8A:
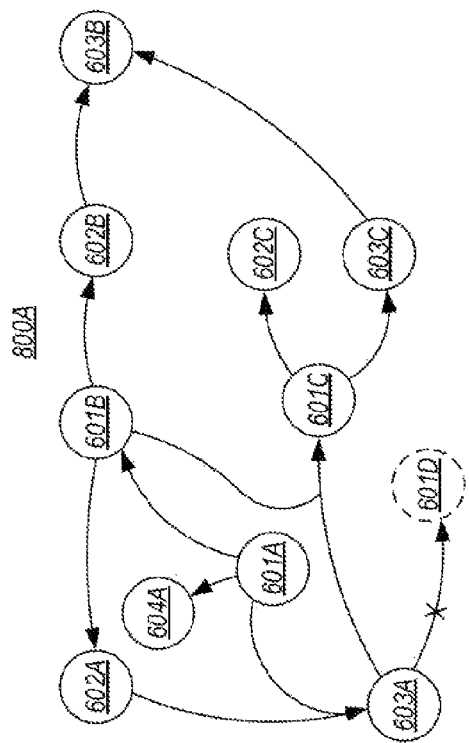
FIG. 8A illustrates an augmented transformation chain representing the joining of the transformation chains of FIGS. 6A, 6B and 6C.

FIG. 8A illustrates a joined transformation chain 800A that includes transformation chains 600A, 600B and 600C also being joined. Dependency elements in each of the transformation chains are replaced with the actual node referred to the extent that the dependency element refers to a node within any of transformation chains 600A, 600B or 600C. Note that all of the illustrated nodes are actually nodes in the transformation chain, except for dependency element 601D. The functionality of the compound application becomes better than the sum of the functionality of the individual transformation chains 600A, 600B and 600C.

The transformation chain 600D includes two nodes 601D and 602D. However, the transformation chain 600D also includes a single dependency element 603A referencing a node in a different transformation chain class 600A. Again, instances of the transformation chain class 600D may operate independently as a single application. For instance, the value from data source 601D may be provided through a transformation to generate the resulting value for data target 602D.

Though transformation chain instances 600A and 600D may operate independently, FIG. 7D illustrates a joined transformation chain 700D that includes transformation chain 600A joined with transformation chain 600D. Dependency elements in each of the transformation chains are now replaced with the actual node referred to the extent that the dependency element refers to a node within any of transformation chains 600A or 600D. Now all of the nodes that have the suffix A or D are nodes within the transformation chain, and only those nodes that have suffixes B or C are dependency elements. For instance, nodes 601A, 602A, 603A, 604A, 601D and 602D are nodes within the augmented transformation chain 700D, and the functionality of the compound application becomes somewhat better than the sum of the functionality of the individual transformation chain 600A and 600D.

Note that FIGS. 7A through 7D illustrate all of the possible permutations involving two and only two of the transformation chains 600A, 600B, 600C and 600D. The transformation chains 600B and 600D are not joined directly in a two transformation chain combination, since neither transformation chain has a dependency element referring to a node in the other transformation chain. Furthermore, transformation 600C and 600D are not joined directly in a two transformation chain combination, since neither has a dependency reference to the other.

Figure 8C:
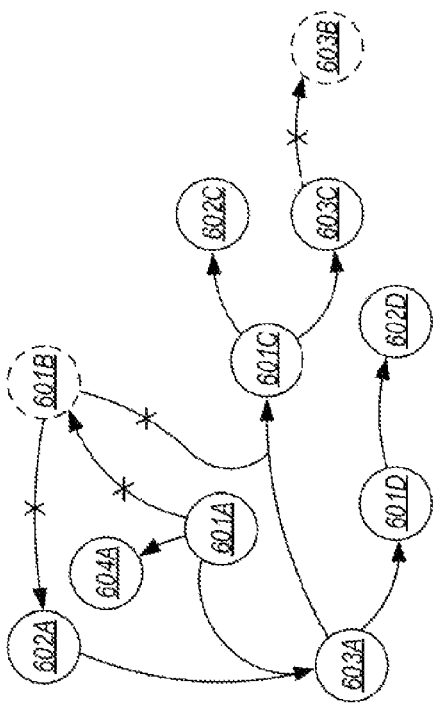
FIG. 8C illustrates an augmented transformation chain representing the joining of the transformation chains of FIGS. 6A, 6C and 6D.
Figure 9:
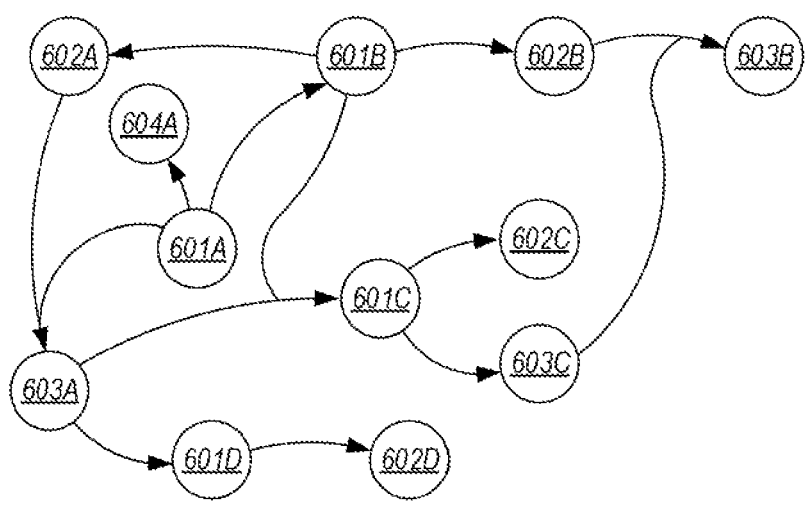
FIG. 9 illustrates an augmented transformation chain representing the joining of the transformation chains of FIGS. 6A, 6B, 6C and 6D.

FIG. 8A illustrates one of three possible combinations of three and only three transformation chains 600A, 600B, 600C and 600D. In particular, FIG. 8A illustrates an augmented transformation chain 800A that combines transformation chains 600A, 600B and 600C. FIG. 8B illustrates an augmented transformation chain 800B that combines transformation chains 600A, 600B and 600D (in which all nodes are part of the transformation chain except dependency elements 601C and 603C). FIG. 8C illustrates an augmented transformation chain 800C that combines transformation chains 600A, 600C and 600D (in which all nodes are part of the transformation chain except dependency elements 601B and 603B). Note that there is no combination of transformation chains 600B, 600C, and 600D illustrated since the transformation chain 600D includes no dependency references to transformation chain 600B (or vice versa), or to transformation chain 600C (or vice versa). FIG. 9 illustrates a combined transformation chain 900 that includes all of the transformation chains 600A, 600B, 600C and 600D combined.

Accordingly, given the transformation chains 600A, 600B, 600C and 600D associated with respective devices 501 through 504 in the environment, there are 8 possible compound applications that may be formed (corresponding to the transformation chains of FIGS. 7A through 7D, FIGS. 8A through 8C, and FIG. 9). Thus, as the transformation chains of various devices are joined into and decoupled from the environment, the very transformation chain itself changes, and the structure of the compound application thereby changes. For instance, a change in the value of data source 601A might have a very different impact on the transformation chain as the effects of that change are automatically propagated through one or more transformations, depending on whether that data source 601A is within transformation chain 600A alone, within transformation chain 700A, within transformation chain 700B, within transformation chain 700D, within transformation chain 800A, within transformation chain 800B, within transformation chain 800C, or within transformation chain 900.

As an example, suppose that device 501 first enters the environment resulting in the transformation chain 600A being used. Device 502 then enters the environment resulting in the transformation chain 600B joining transformation chain 600A, resulting in transformation chain 700A. Thus, the operating transformation chain changes from transformation chain 600A to transformation chain 700A. Now suppose the third device 503 enters the environment resulting in the transformation chain 600C joining the transformation chain 700A, thereby resulting in the transformation chain 800A. Thus, the operating transformation chain changes from the transformation chain 700A to the transformation chain 800A. Now suppose the device 500B leaves. The transformation chain 700B would then become operative. Now suppose that device 504 enters the environment resulting in the transformation chain 600D joining the transformation chain 700B, resulting in transformation chain 800C becoming the operating transformation chain. Now suppose device 500C leaves, resulting in the transformation chain 700D being operative. Now suppose device 501 leaves, resulting in the transformation chain 600D being operative. Finally, the device 504 leaves, leaving no operating transformation chain in the environment. In this scenario, the operating application changed structure (and thus changes functionality) seven times as follows: 1) beginning with transformation chain 600A, 2) then shifting to transformation chain 700A, 3) then shifting to transformation chain 800A, 4) then shifting to transformation chain 700B, 5) then shifting to transformation chain 800C, 6) then shifting to transformation chain 700D, 7) then completing with transformation chain 600D.

Figure 10:
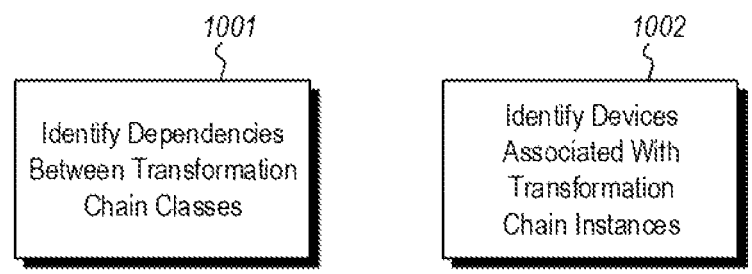
FIG. 10 illustrates a flowchart of a method for preparing for the facilitating of a compound application.
Figure 11:
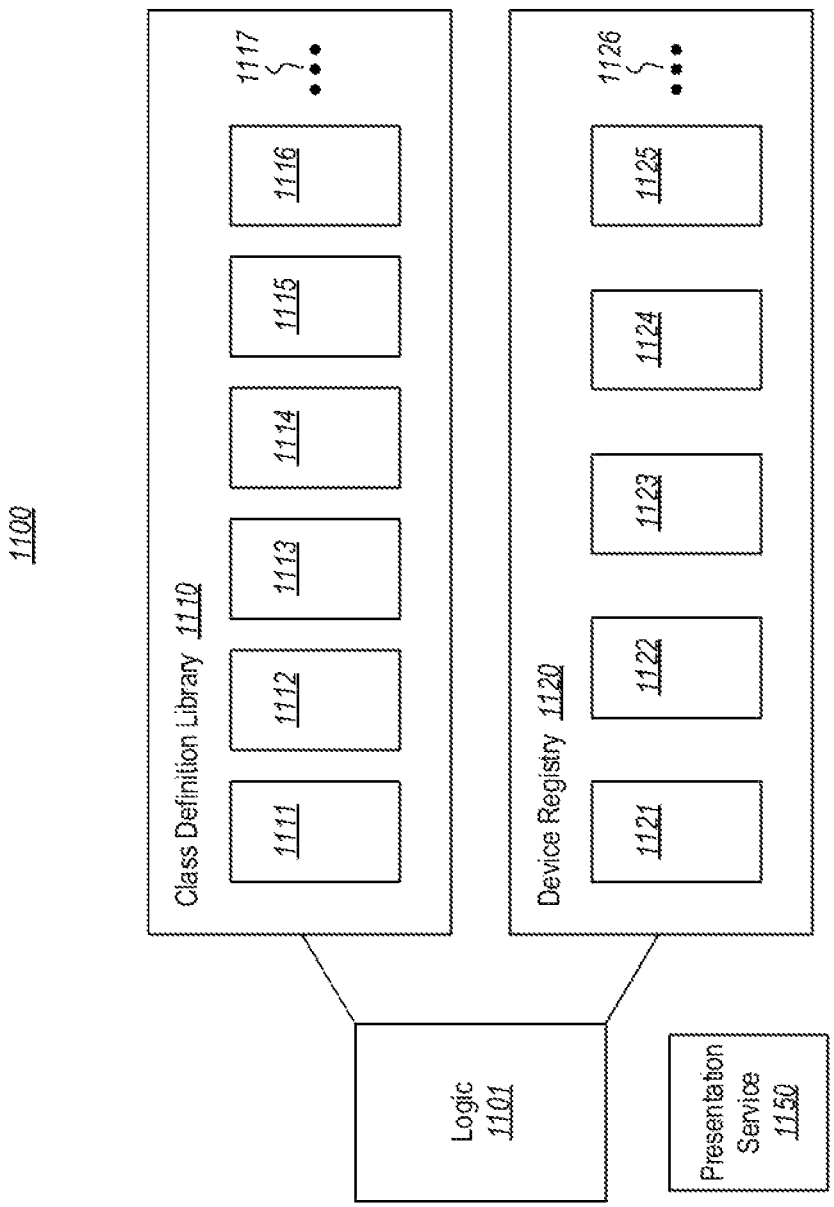
FIG. 11 abstractly illustrates a system that may be used to perform the method of FIGS. 10, 12, 13 and 14, and that includes a library of transformation chain class definitions and device registrations, as well as a presentation service.

FIG. 10 illustrates a flowchart of a method 1000 for preparing for the facilitating of a compound application represented by multiple joined transformation chain instances. The method 1000 may be performed by any of the devices 501 through 507 that are within the environment 500. Alternatively or in addition, the method 1000 may be performed external to the devices 501 through 507, such as for example by external system 510 of FIG. 5. For instance, the external system 510 might be a service provided in a cloud computing environment. Regardless of where the method 1000 is performed, FIG. 11 illustrates a system 1100 that may perform the method 1000. Accordingly, regardless of whether the system 1100 is incorporated into one or more of the devices 501 through 507 or whether the system 1100 is the external system 510 of FIG. 5, or combinations thereof, the method 1000 will now be described with frequent reference to the system 1100 of FIG. 11.

The method 1000 includes two acts 1001 and 1002 that have no temporal dependencies. For instance, the method includes identifying dependencies between different transformation chain classes (act 1001). These dependencies are essentially authorizations created by the class author that generated the class in order to allow instances of different transformation chain classes to interoperate (subject to further instance-based approval).

For instance, system 1100 includes a logic component 1101 and a transformation class definition library 1110 that is illustrated as including six transformation chain class definitions 1111 through 1116. However, the ellipses 1117 represents that the transformation chain class definition library 1110 may include any number of transformation chain class definitions. As an example, suppose that the transformation chain class definitions 1111, 1112, 1113 and 1114, respectively define transformation chain classes 600A, 600B, 600C and 600D of FIGS. 6A through 6D. Since each transformation chain class defines dependency elements, the system 1100 may use the library 1110 to identify dependencies between different transformation chain classes.

For example, by observing dependency element 601B of the transformation chain 600A, and dependency element 601A in transformation chain 600B, the logic component 1101 may identify a dependency between nodes 601A and 601B that would exist if the transformation chain classes 600A and 600B were joined, or if instances of the class were joined. The logic component 1101 may infer that the authors of the transformation chains 600A and 600B both consent to authorize joining (presuming that the users also authorize at the instance level at runtime) at these dependency elements.

The method 1000 also includes identifying (act 1002) devices that are associated with instances of any of the transformation chain classes. The devices may themselves identify to the system 1100 with perhaps the device identifier, as well as potentially any transformation chain classes that the device wishes to use. Alternatively, the system 1100 might have a particular default transformation class associated with each device, and thus just perhaps receive the device identifier. There might be some transformation chain classes that a device is licensed to use and other transformation chain classes that the device is not licensed to use.

For instance, the system 1100 also includes device registrations 1120 that includes registration of devices as associated with various transformation chain classes. For instance, the device registrations 1120 include five device registrations 1121 through 1125, although the ellipses 1126 represent that the device registrations 1120 may include any number of device registrations. Furthermore, the device registrations 1120 may be persisted for long term and/or may perhaps just be kept for a short while. Regardless, the system 1100 identifies multiple devices and finds associated transformation chains for those devices. As an example only, perhaps the devices 501 through 504 of FIG. 5 are associated with registrations 1121 through 1124. By such association, the system 1100 is able to detect that transformation chain instances 600A, 600B, 600C, 600D (respectively, defined by transformation chain class definitions 1111, 1112, 1113 and 1114) are respectively associated with those devices 501 through 504.

In some embodiments, the system 1100 itself runs a representation of an instance of the particular transformation chain class on behalf of the respective device. For instance, upon identifying that the transformation chain class 600A is associated with device 501, the system 1100 may operate a representation of the transformation chain instance 600A for the device 501. Accordingly, as inputs are received from the device, the system 1100 identifies the change with a particular node in the transformation chain, and propagates the chains throughout the transformation chain. This will be referred to as a "hands-on" approach". This hands-on approach has some advantages in that processing may be offloaded to devices or systems or clouds that have greater processing ability than the device that is providing the input itself.

In another approach referred to herein as a "hands-off" approach, the device is associated with the transformation class by itself running the instance of the class. When a dependency is encountered with another transformation chain associated with another device, the data may be flowed directly (e.g., via peer to peer networking) to that device if that other device is also engaged in the hands-off approach. Alternatively, the device could flow the data indirectly to the other device (e.g., via an external system or a cloud). If the external system 510 is running the representation of the instance of the transformation chain class for that other device, the device may instead flow the data into the external system 510 for further propagation into the remainder of the transformation chain.

Figure 12:
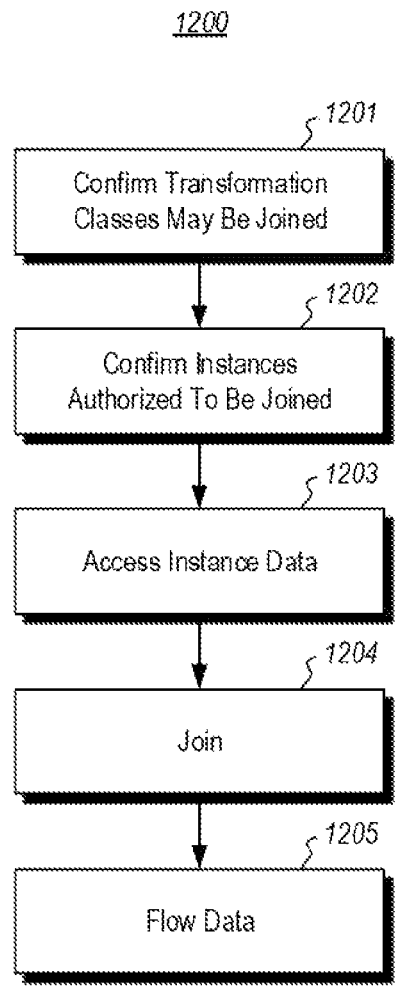
FIG. 12 illustrates a flowchart of a method for joining two instances of transformation chain classes.

FIG. 12 illustrates a flowchart of a method 1200 for joining two instances of transformation classes. First, the transformation chain classes are confirmed to be the type that can be joined (act 1201). For instance, if the transformation chain classes do not refer to each other, then perhaps there is no class-based authorization to join instances of the respective class. For instance, the transformation chain class 600D cannot be joined with the transformation chain class 600B or the transformation chain class 600C, because the transformation chain class 600D does not refer to elements in the transformation chain class 600B or 600C. However, the transformation chain class 600D can be joined with the transformation chain class 600A because they mutually contain dependency references to each other.

In this example, however, though transformation chain class 600D cannot be directly joined to transformation chain classes 600B and 600C, the transformation chain class 600D can be joined with transformation chains 700A, 700B, and 800A even though those transformation chains 700A, 700B and 800A include one or both of transformation chains 600B and 600C.

However, in an alternative embodiment, the author of a transformation chain class may specify further restrictions on joining other transformation chain classes. For instance, an author might indicate a general restriction that joining a particular transformation class instance is not permitted if that transformation class instance is already a compound transformation chain and/or if the compound transformation chain has a particular constituent transformation chain. For instance, when joining two transformation chain instances, the system 1100 might keep track of the transformation class identities that were used to construct the compound transformation chain up to that point. That list might be used to confirm whether the conditions for class-based authorization have been met.

The author might also express restrictions at the granularity of a single dependency. For instance, in the dependence element 601B of transformation chain class 600A, the author might express that joining is authorized on that dependency element only if the transformation chain into which it is joined does not include an identified transformation chain class authored by a competitor. The author might also control data that is flowed out of the transformation chain to another joined transformation chain by writing restrictions or conditions into the transformation that would bridge the dependency itself (e.g., between nodes 601A and dependency element 601B).

However, even though transformation chain classes may interoperate, that does not mean that the user wants their particular instance of that transformation chain class to join with other instances of other transformation chain classes. After all, the data itself (e.g., the instance state) might be sensitive to the user. Accordingly, the method 1200 also includes determining that instances of different transformation chain classes are to be joined (act 1202).

The joining criteria for authorizing two instance of different transformation chain classes to join may include one or more of the following: whether or not the user is on a meeting attendee list, a relationship (e.g., family, social network friend, or the like) of users of the various devices, a communication capability (e.g., near field) between the devices, a proximity of the respective devices (e.g., in the same conference room), the request of the users, of the like. For instance, the joining criteria might include some business criteria such as the associated users of the instances are on the same team. As another example, one device might be a kiosk in a retail space or hotel, where a customer uses the kiosk and a shop assistant or concierge can automatically use their device to join their transformation chain with that of the kiosk to thereby interact with the customer using the compound application. Conditions may be applied to the joining criteria. For instance, a bellhop's device might be able to join a customer's application if the concierge not around (perhaps detected by the concierge not actively using the pairable application to join with that of customers, or being off network).

Unless the instance of the transformation chain class associated with the device is to be started in a default state defined by that class, in the hands-on approach the device may then upload instance data (e.g., the values at each of the nodes of the transformation chain associated with the device) to the system 1100 (act 1203). In the hands-off approach, perhaps the instance data at only the boundary nodes is uploaded to the system 1100.

The transformation chain instance then joins with the remainder of the transformation chain (act 1204). For instance, this may be accomplished by searching the source transformation chain instance for dependency elements that correspond to nodes in the target transformation chain instance. Once such a dependency element is found, that dependency element is replaced with the actual identified node in the target transformation chain instance, thereby creating an actual link between the source and target transformation chain instances. This is repeated for all such found dependency elements in the source transformation chain instance that identifies a node in the target transformation chain instance. If there are dependency elements found in the source transformation chain instance that do not correspond to a node in the target transformation chain instance, then those dependency elements remain dependency chain elements in the merged transformation chain instance.

Note that in the examples of FIGS. 6A through 6D, none of the transformation chain classes 600A through 600D include dependency elements that refer to the same class. However, the principles described herein may operate even if an instance of a particular transformation chain class may have a dependency element referring to another node in another instance of the same particular transformation chain class. Furthermore, if permitted by a particular node being joined to, multiple nodes may from one or more different transformation chain instances may join the particular node.

Once joined, the transformation chain augments, and data flows within the augmented transformation chain (act 1205), much as if the transformation chain were originally authored in augmented fashion in the first place. For instance, once an instance of the transformation chain class 600A joins an instance of the transformation chain class 600B, the result is a single instance of the transformation chain class 700A. Once an instance of the transformation chain class 600A joins an instance of the transformation chain class 600C, the result is a single instance of the transformation chain class 700B. Once an instance of the transformation chain class 600B joins an instance of the transformation chain class 600C, the result is a single instance of the transformation chain class 700C. Once an instance of the transformation chain class 600A joins an instance of the transformation chain class 600D, the result is a single instance of the transformation chain class 700D.

An instance of the transformation chain class 800A may be formed either by joining instances of the transformation chain classes 700A and 600C, or by joining instances of the transformation chain class 600A and 700C. An instance of the transformation chain class 800B may be formed by joining instances of the transformation chain classes 700A and 600D. An instance of the transformation chain class 800C may be formed by joining instances of the transformation chain classes 700B and 600D. This joining operation may be performed many times to thereby create a very large transformation chain in situations in which there are many devices available for collaboration in a given environment.

Accordingly, once joined (act 1204), data may flow freely (act 1205) within the augmented transformation chain even across what used to be boundaries between constituent transformation chains. For instance, in the transformation chain 700A of FIG. 7A, data may flow freely (without the user of an application program interface and without function calls) from the node 601A to the node 601B (via appropriate transformation(s)) precisely as data may flow from node 601A to the node 604A (via appropriate transformation(s)).

Accordingly, the system may be used to join transformations associated with a wide variety of devices in a relatively automated and convenient fashion to thereby augment the transformation chain of a compound application that is shared across multiple devices. This enables a wide variety of scenarios.

For instance, consider individuals arriving at a meeting in a particular conference room. Upon the first user entering the conference room with a laptop computer and a smartphone, a transformation chain instance associated with the smartphone is joined with at transformation chain instance of the laptop such that a single application is running effectively across the first users smartphone and laptop. A second user enters the conference room a moment later. The second user is also on the meeting invite, and so that user's smartphone transformation chain is joined to the existing compound transformation chain to further augment the transformation chain. A television screen then automatically turns on to output some of the data associated with the meeting. A third user enters with a tablet computer and is also a meeting invitee. Thus, the transformation chain associated with the tablet computer joins the compound transformation chain to further augment the transformation chain. Thus, as more devices join an environment suitable for joining transformation chains, the application running across all of the devices is actually augmented, thereby changing the functionality of the application itself. Multiple users may each share in the environment such that multiple users are observing each of at least one or some of the devices.

Figure 13:
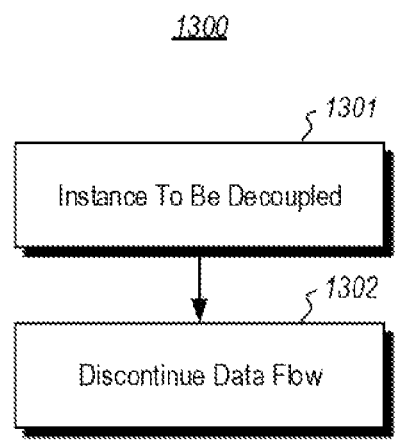
FIG. 13 illustrates a flowchart of a method for decoupling a transformation chain from a larger transformation chain.

FIG. 13 illustrates a flowchart of a method 1300 for decoupling transformation chains. Just as there is a method for joining transformation chains when devices enter an environment, there is a method for decoupling transformation chains when devices exit the environment. First, the system determines that an instance of a transformation chain class is to be decoupled (act 1301). In response, the flow of data is discontinued to and from that instance (act 1302). The decoupling criteria used for determining that the instance should be decoupled might include any criteria, but as an example, may include, one or more of a proximity of the device associated with the instance with other devices in the environment, a meeting conclusion status, a communication capability between the device associated with the instance and other devices in the environment, the request of the user, and so forth. Thus, transformation chains may change dynamically as devices enter and exit the environment.

In one embodiment, the system 1100 includes a presentation service 1150. One or more nodes of the transformation chain instance that is running may drive rendering on one or more surrounding devices. Likewise, one or more devices may provide input into one or more nodes of the transformation chain instance. For instance, suppose that an instance of the transformation chain 900 is running in the environment 500 of FIG. 5, and that devices 501 through 504 are associated with instances of respective transformation chain classes 600A through 600D, thereby resulting in the instance of the augmented transformation class 900. Referring to FIG. 9, suppose nodes 601A and 601C are input nodes and nodes 604A, 603B, 602C and 602D are output nodes. The presentation service 1150 might select which devices may provide input to nodes 601A and 601C, and if so, what transformations are to be performed. In one example, the devices are associated with their respective portions of their transformation chains such that input nodes within that respective portion are provided by the respective device. Thus, by default, the input node 601A, being originally part of the transformation chain 600A, might be provided input from the device 501 (after potentially some transformation(s)). Also, in the default case, the input node 601C, being originally part of the transformation chain 600C, might be provided input from the device 503 (after potentially some transformation(s)). The presentation service 1150 might also select which devices are to render the output from nodes 604A, 603B, 602C and 602D, and what (if any) transformations are to be performed.

Figure 14:
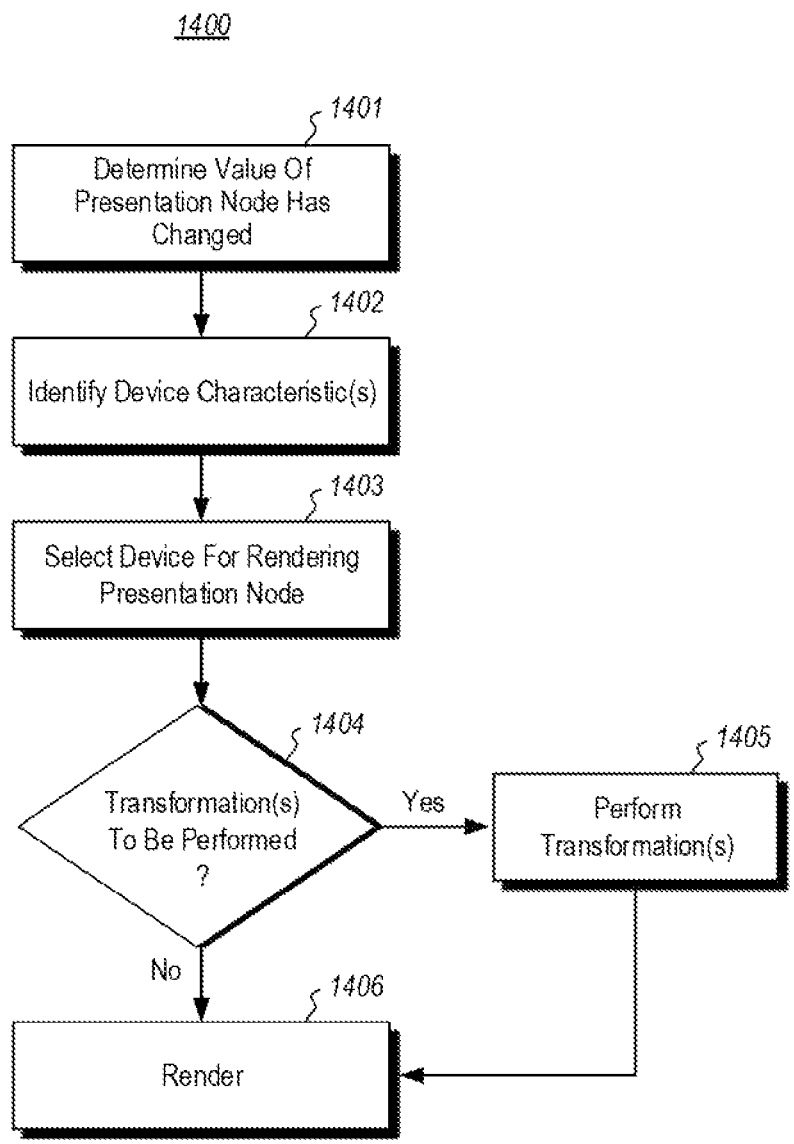
FIG. 14 illustrates a flowchart of a method for rendering changes in one or more presentation nodes of the transformation chain onto an appropriate device.

FIG. 14 illustrates a flowchart of a method 1400 for rendering output of a transformation chain in a multiple device environment. The method 1400 may be performed by the system 1100 of FIG. 11, or perhaps by the presentation service 1150 of FIG. 11. The logic component 1101 determines (act 1401) that a particular node (a presentation node) of an instance of a transformation chain class has changed. For instance, in the example, nodes 604A, 603B, 602C and 602D are each output nodes, or "presentation nodes".

The logic component also identifies characteristics (act 1402) of multiple candidate devices on which at least a version of that changed output may be rendered. For instance, the logic component 1101 might refer to the device registry 1120 and/or inquire of the devices directly in order to determine the rendering capability of each device. The characteristics of each device might also include a juxtaposition of each user with respect to the device.

The system then selects (act 1403) at least one of the candidate devices on which to render the at least the version of the rendering based on the identified characteristics. The system makes the selection in order to maximize the usability of the output. For instance, if the output is intended for all users, and all users are physically present, the output might be rendered on a larger screen. If the output is interactive and requires input from a particular device, that device might be selected for the output.

The system determines if any transformations are to be applied (decision block 1404) to the rendering before actual output to the device. The transformations take into consideration the suitability of the selected device(s), where the transformations may differ depending on the selected device(s) for rendering. Examples of transformations include changing a type of the rendering (e.g., text to speech, speech to text, video to text, text to video, and so forth). The transformations might also include cinematization of the output. For instance, a video might be created from the input, in which a backdrop is provided and perhaps changed as appropriate, and moving elements are moved into and out of the video.

If transformations are to be performed ("Yes" in decision block 1404), then those transformations are performed (act 1405). Finally, the rendering is facilitated on the selected device (act 1406). Accordingly, the compound transformation chain may take input from any device in any form, and transform the input, if needed, into a form that is recognized by an input node of the compound transformation chain. Thus, this input is propagated throughout the transformation chain. If the values of one or more presentation nodes change, an appropriate device may be selected for rendering the output. Accordingly, the most suitable device for rendering may be selected without regard for which device was associated with the portion of the transformation chain that contains the presentation node. For instance, changes in value of the presentation node 604A need not be rendered exclusively or even at all of the device 501 that corresponds to the transformation chain instance 600A. Multiple users may each share in the environment such that multiple users are observing each of at least one or some of the devices.

A detailed scenario (called hereinafter the "devices scenario") will now be described with respect to FIGS. 15A through 15M (referred to collectively as "FIG. 15"). This scenario is provided as just one of an infinite variety of scenarios that are enabled by the broader principles described herein. In this scenario, a user is ordering various computing devices. The scenario involves four devices 1501, 1502, 1503 and 1504, although the scenario begins in FIG. 15A with only two devices 1501 and 1502 being visible. Each of the four devices 1501 through 1504 participate in providing input to and receiving output from a compound application.

Figure 15A:
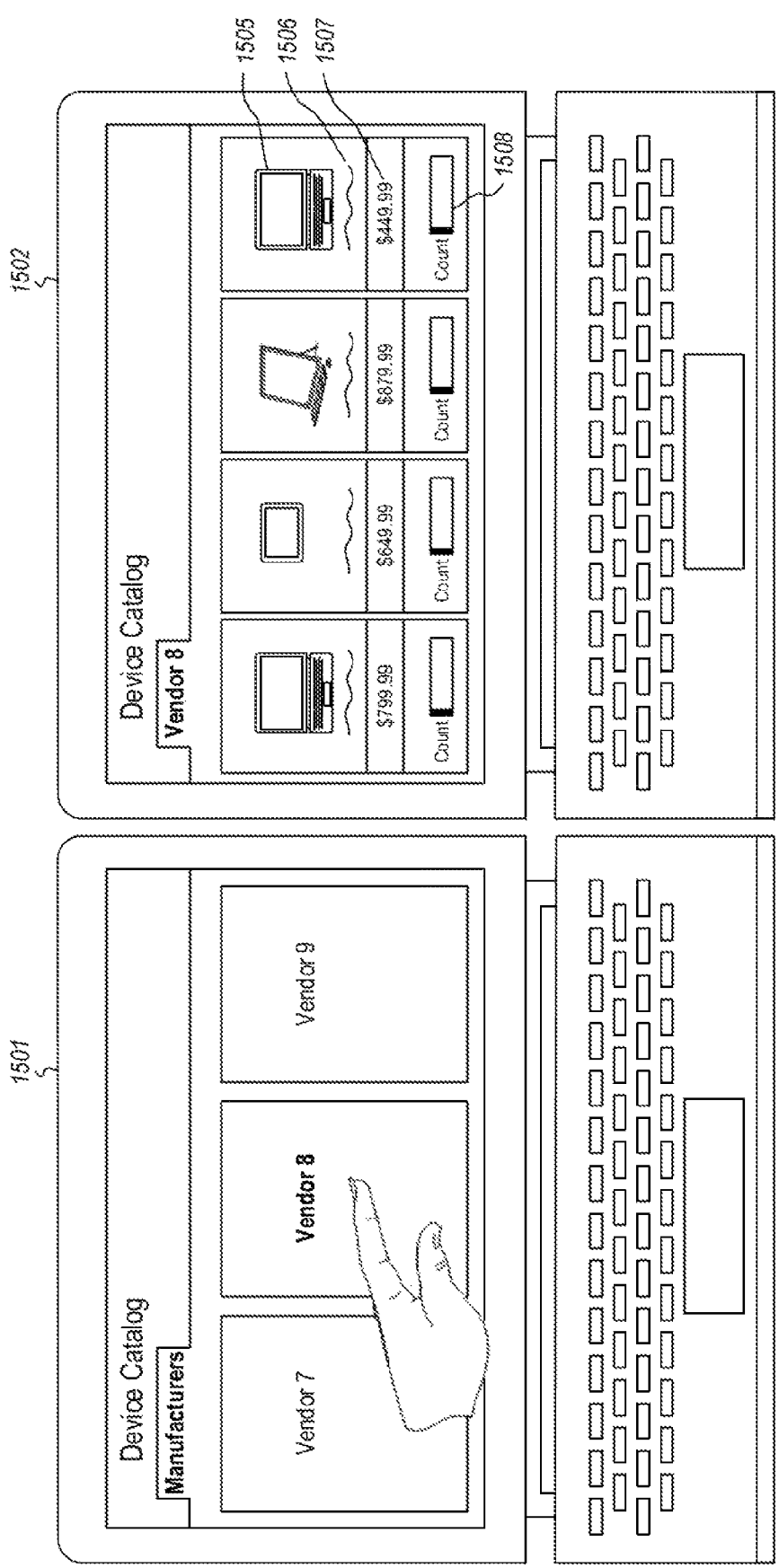
FIGS. 15A through 15J illustrates various user interfaces that may be experienced in a scenario referred to herein as a "device scenario", in which a user is to order a number of devices.

FIG. 15A introduces two devices 1501 and 1502 that are laptop computers. Suppose that these two devices 1501 and 1502 are initially the only devices in the operating environment, and thus their respective transformation chains have been joined. The transformation chain associated with device 1501 allows for navigation and selection of a manufacturer. The transformation chain associated with the device 1502 allows for the navigation of a list of devices offered by the manufacturer, and also allows the user to change a count of any of the devices in the list.

More specifically, device 1501 allows the user to horizontally scroll through a number of manufacturers, and select a manufacturer. In FIG. 15A, the device 1501 shows only three such manufactures labelled "Vendor 7", "Vendor 8" and "Vendor 9", with the user having selected "Vendor 8". On the other hand, the device 1502 shows a horizontally scrollable list of devices that are provided by the vendor selected in the device 1501. In FIG. 15A, since the Vendor 8 is selected on device 1501, the device 1502 illustrates a list of devices provided by Vendor 8. Each item in the device list includes a picture 1505 of the device, a name 1506 of the device, a per unit cost 1507 of the device, and a count 1508 of the device being ordered. The count for each device may be controlled using a corresponding scroll control.

Figure 15B:
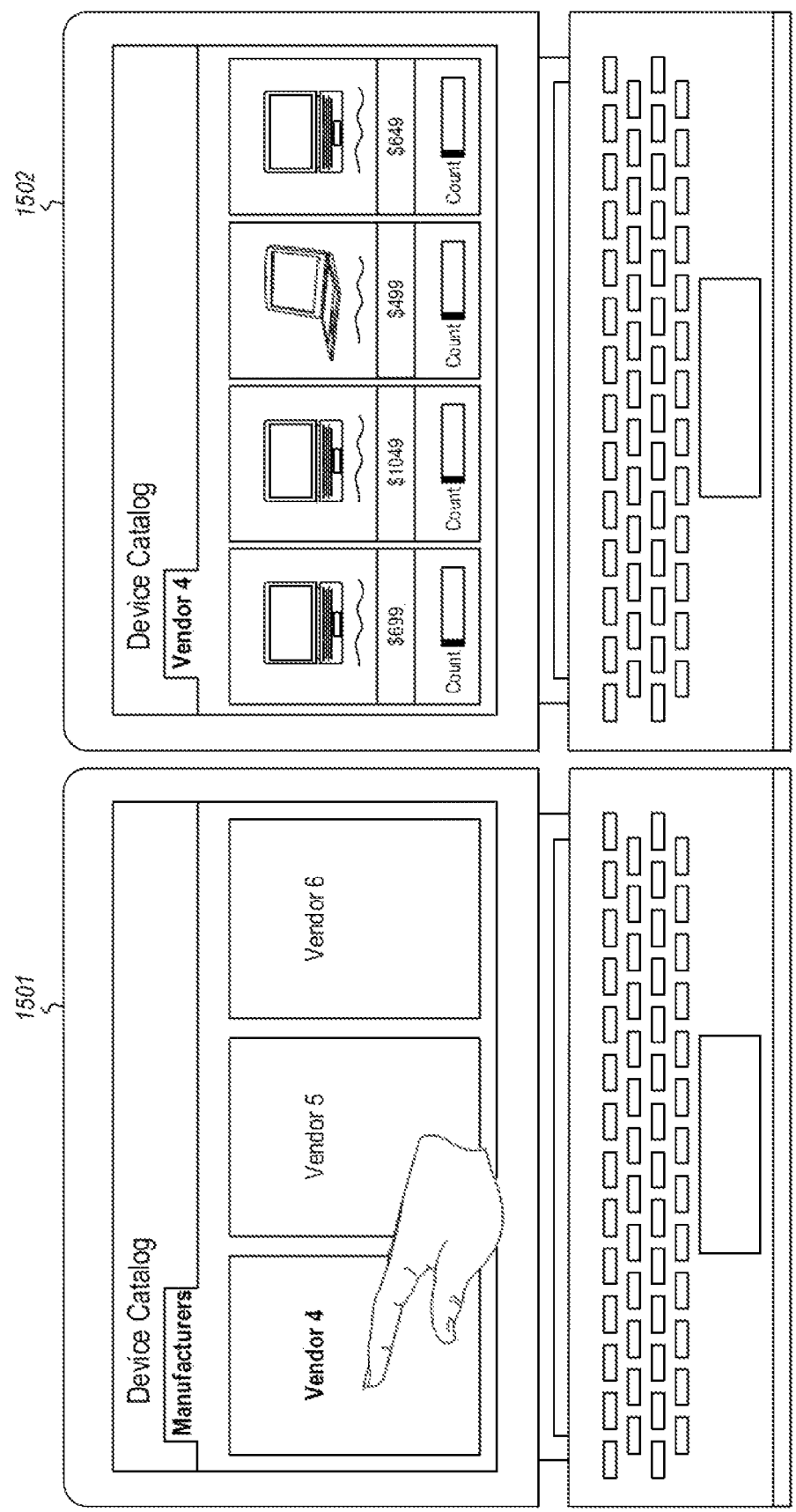

FIG. 15B shows a state of the scenario which has progressed from the state of FIG. 15A, in that the user has scrolled the list of manufacturers leftward and also selected "Vendor 4". Accordingly, the output from device 1502 automatically changes to display a list of device manufactured by Vendor 4. To do so, data flowed automatically (without the use of an application program interface) from the transformation chain associated with device 1501 to the transformation chain associated with device 1502.

Figure 15C:
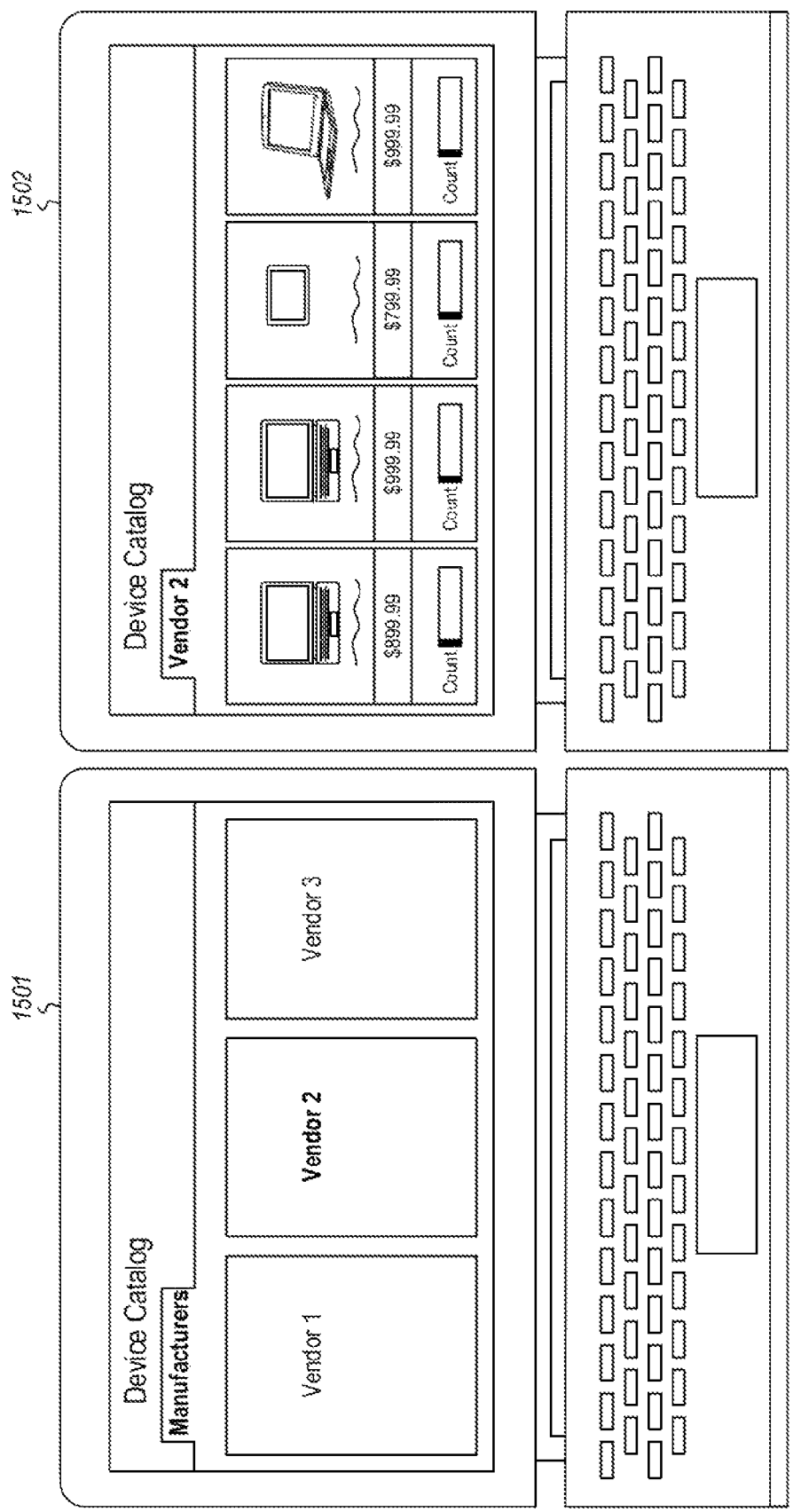

FIG. 15C shows a state of the scenario which has progressed from the state of FIG. 15B, in that the user has scrolled the list of manufacturers leftward and also selected "Vendor 2". Accordingly, the output from device 1502 automatically changes to display a list of device manufactured by Vendor 2. To do so, data again flowed automatically from the transformation chain associated with device 1501 to the transformation chain associated with device 1502.

Figure 15D:
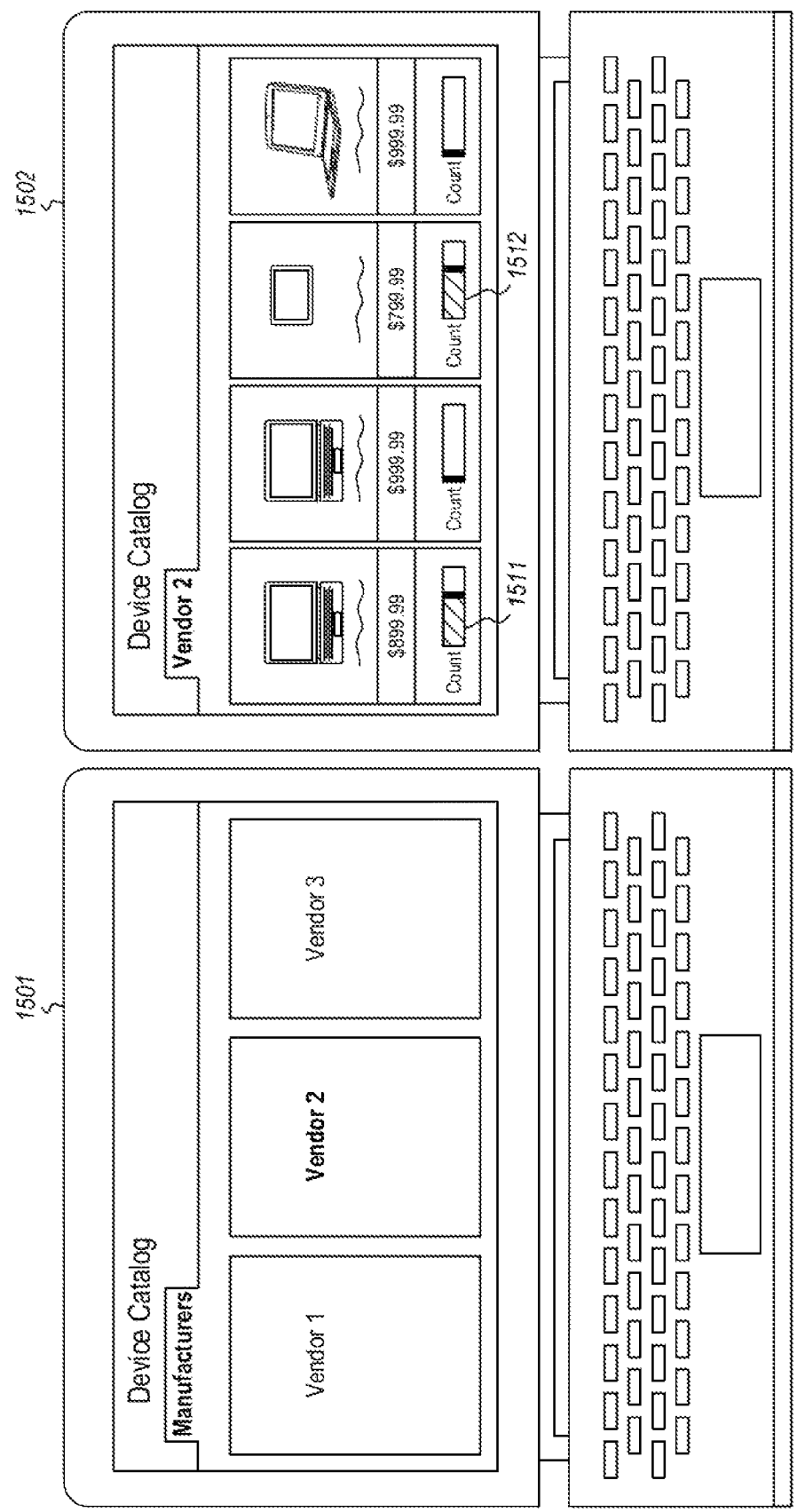
Figure 15E:
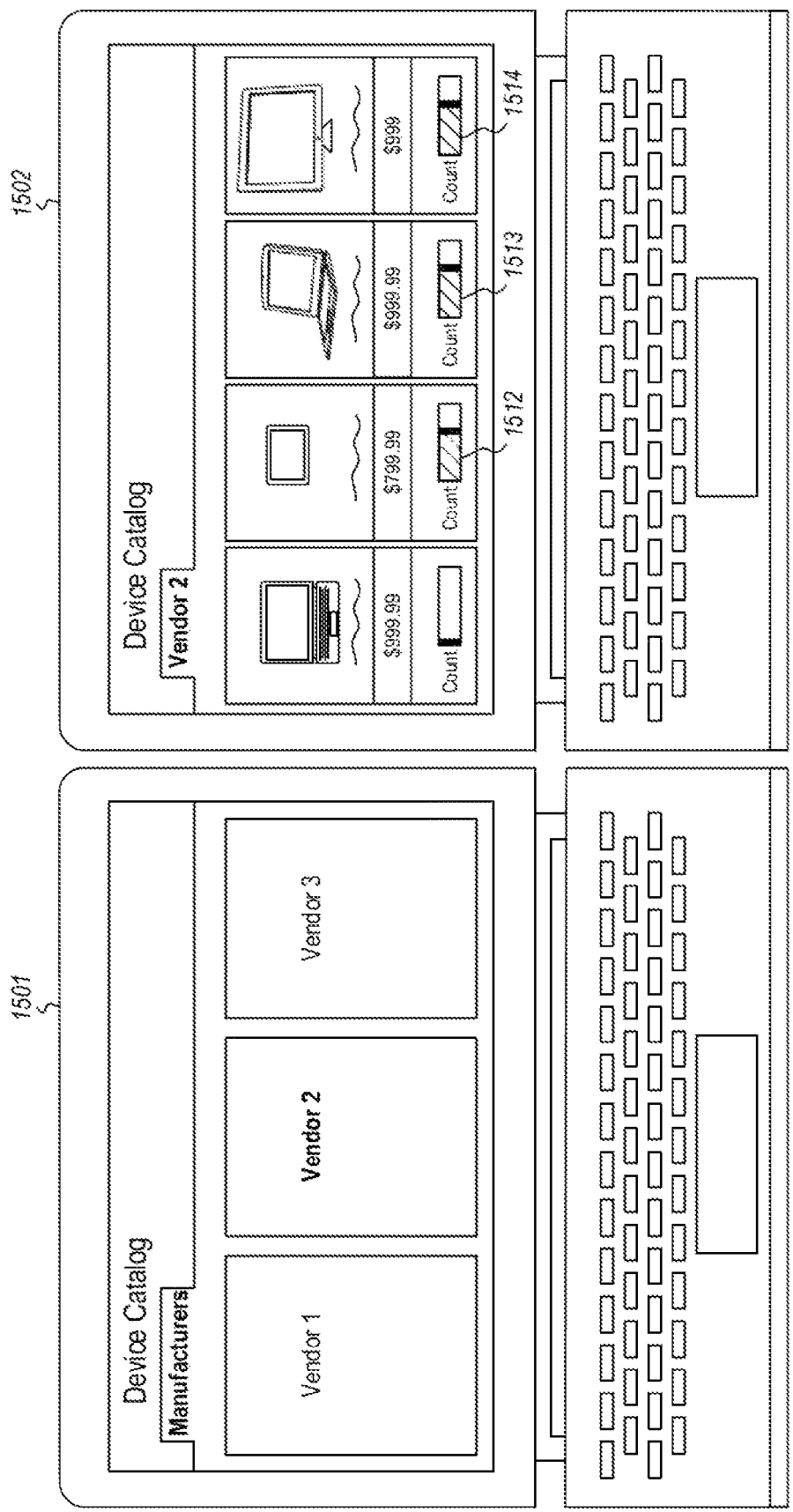

FIG. 15D shows a state of the scenario which has progressed from the state of FIG. 15C, in that the user has used scroll controls 1511 and 1512 displayed on the device 1502 in order to change an order count for two devices offered by Vendor 2. FIG. 15E shows a state of the scenario which has progressed from the state of FIG. 15D, in that the user used device 1502 to scroll rightward through the list of devices offered by Vendor 2 and further used scroll controls 1513 and 1514 displayed on the device 1502 in order to change an order count for two further devices offered by Vendor 2. Accordingly, at this stage, the user has entered order counts for four devices offered by Vendor 2.

Figure 15F:
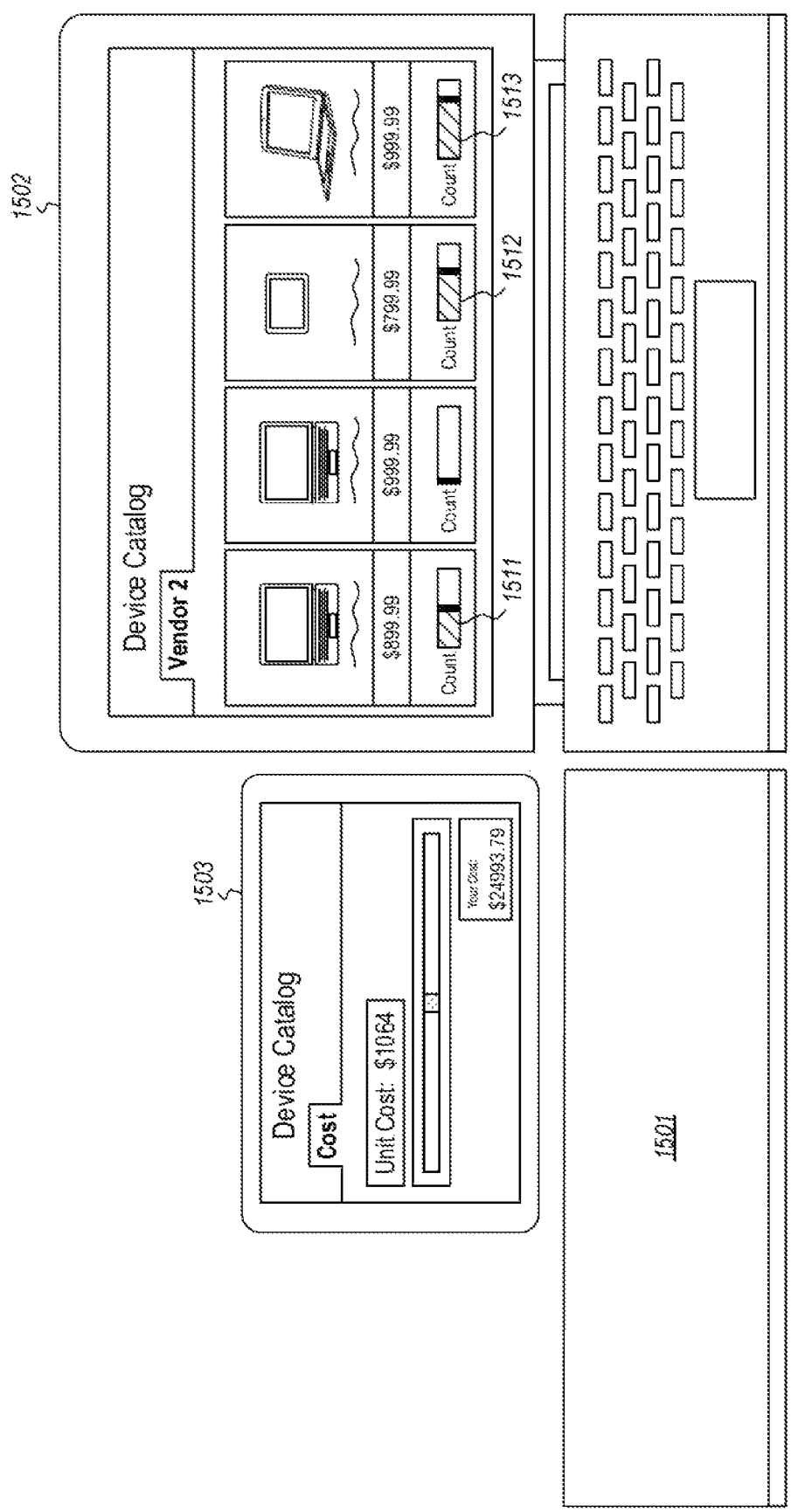

FIG. 15F shows a state of the scenario which has progressed from the state of FIG. 15E, in that a third device 1503 is introduced into the environment. For instance, the third device 1503 might be associated with a transformation chain that displays a maximum unit cost and a total cost for the entire order. Once the device 1503 is introduced into the environment, that portion of the transformation chain is joined with the existing compound transformation chain, thereby changing the functionality of the compound application, to now output such cost data to the device 1503. Once the transformation chain instance is joined, the data representing the counts, and unit costs are flowed to that portion of the transformation chain, causing the device 1503 to be immediately populated. Note that flows also occur in the opposite direction as the device 1503 indicates a maximum unit price, and thus, the list of devices shown in device 1502 is restricted to any device below the maximum unit price. In this case, all of the previously listed devices fell below the maximum unit price and thus there is no change in the visualizations on the device 1502.

Figure 15G:
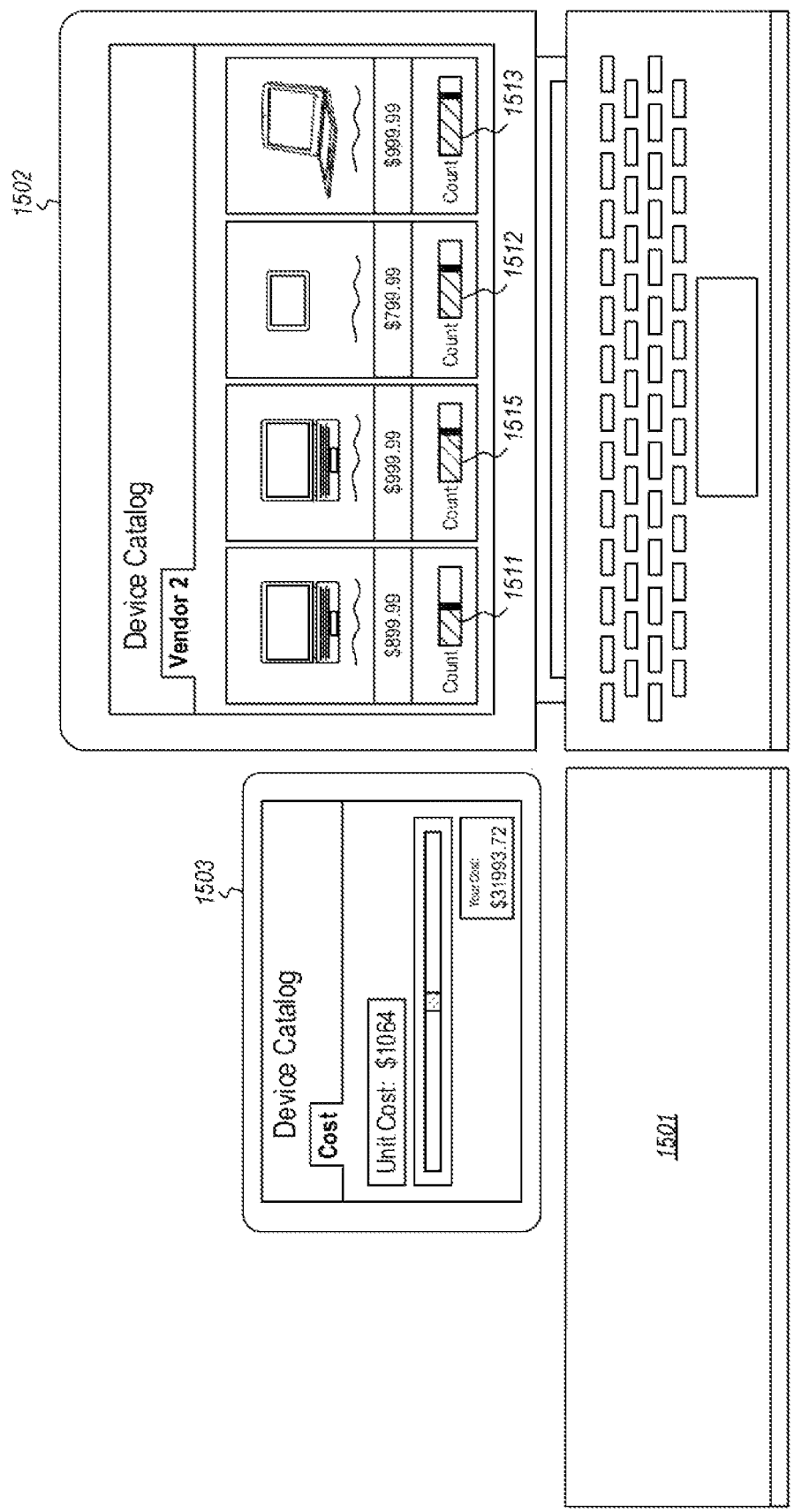

FIG. 15G shows a state of the scenario which has progressed from the state of FIG. 15F, in that the user has used scroll control 1515 on device 1502 in order to enter a count for yet another device offered by Vender 2. The count data and unit cost data is flowed into the portion of the transformation chain corresponding to device 1503, resulting in a change in the total cost displayed on the device 1503.

Figure 15H:
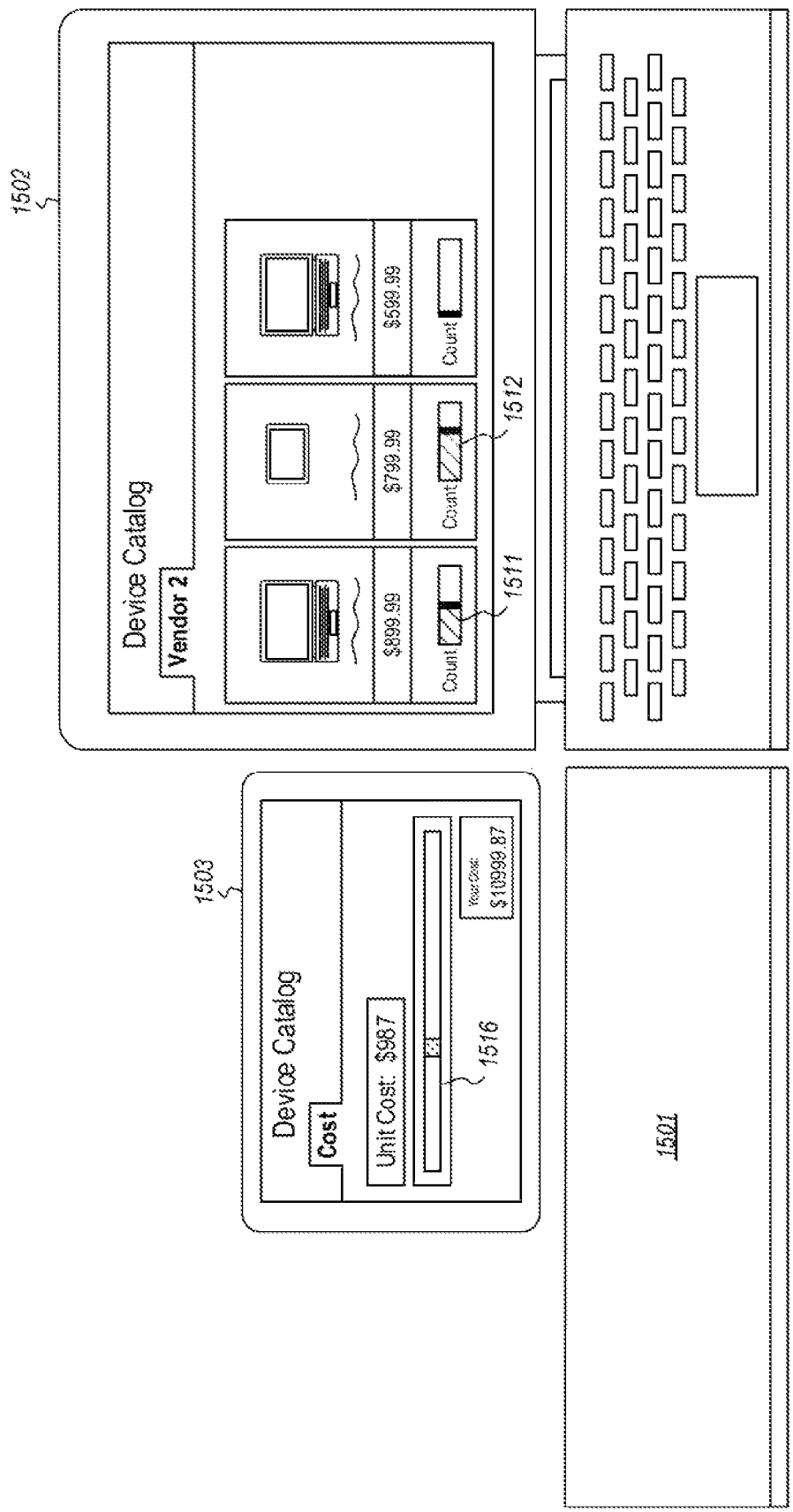

FIG. 15H shows a state of the scenario which has progressed from the state of FIG. 15G, in that the user has adjusted downward the maximum unit price to $987 using scroll control 1516 on device 1503. That maximum unit price change has flowed from the transformation chain portion associated with device 1503 to the transformation chain portion associated with device 1502, causing several devices offered by Vendor 2 to be dropped from the list. If the user returns the amount higher, those dropped items will be automatically added back onto the list, perhaps returning the device 1502 to the state illustrated in FIG. 15G.

Figure 15I:
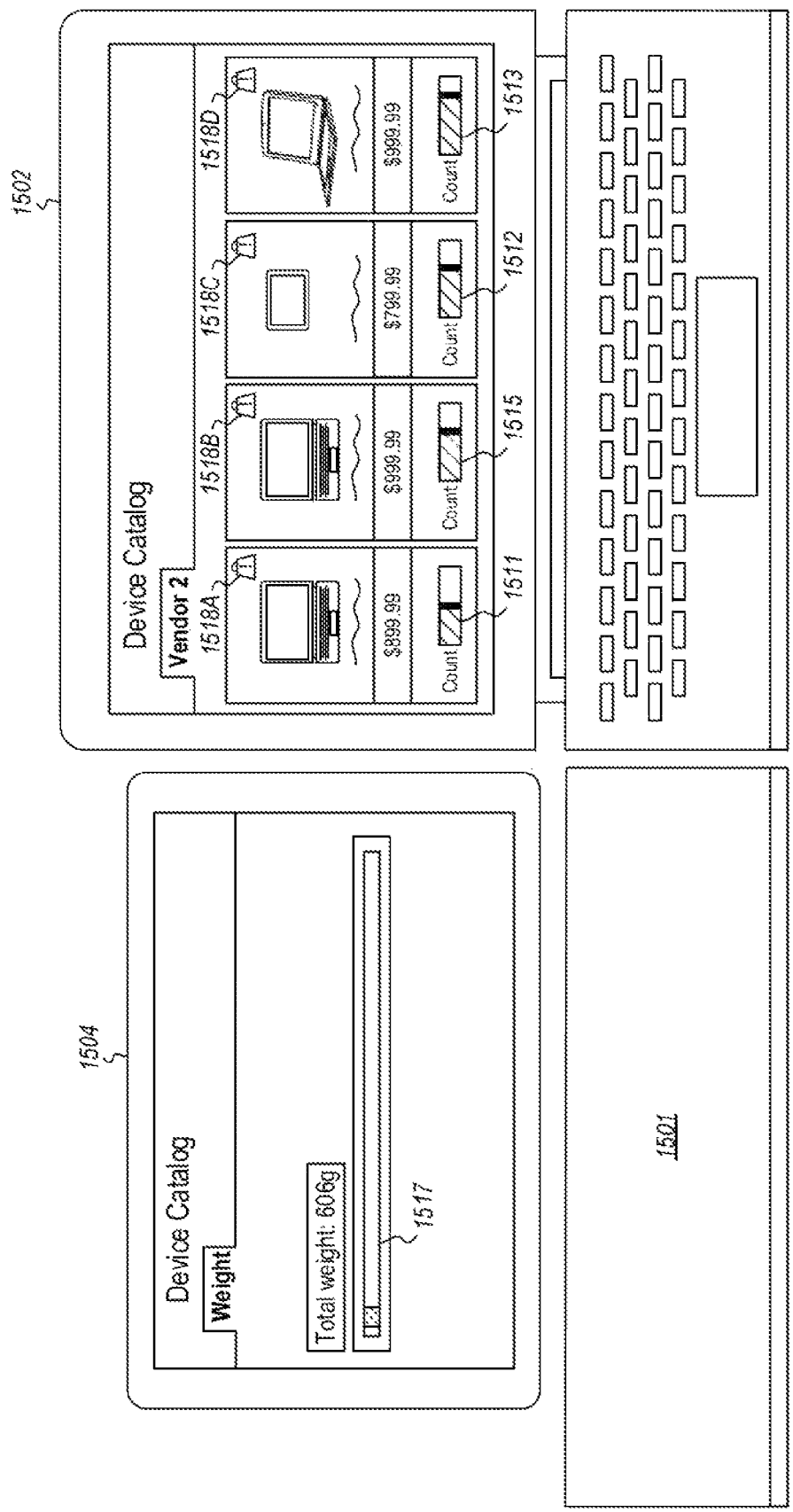

FIG. 15I shows a state of the scenario which has progressed from the state of FIG. 15G, in that a fourth device 1504 is introduced into the environment. For instance, the fourth device 1504 might be associated with a transformation chain that displays a maximum weight of a device. Once the device 1504 is introduced into the environment, that portion of the transformation chain is joined with the existing compound transformation chain, thereby changing the functionality of the compound application, to now output such cost data. Once the transformation chain instance is joined, the data representing the maximum weight is flowed from the portion of the transformation chain associated with device 1504 to the portion of the transformation chain associated with device 1502. The device 1502 responds by displaying an overweight warnings 1518A, 1518B, 1518C and 1518D associated with each device that is heavier than the maximum weight. Currently, in FIG. 15I, the weight is just 606 grams, and thus all of the devices are listed with such a warning.

Figure 15J:
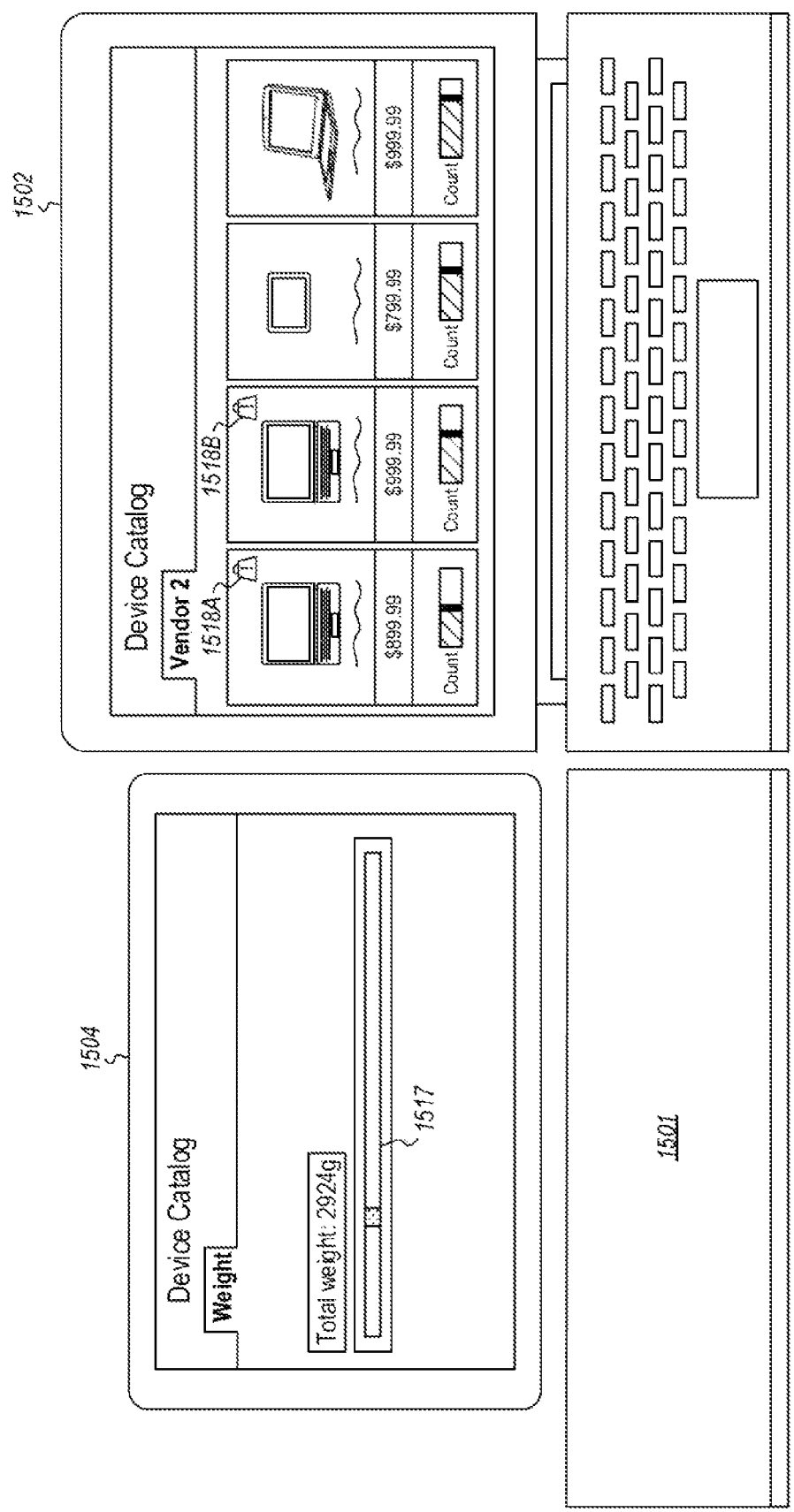

FIG. 15J shows a state of the scenario which has progressed from the state of FIG. 15I, in that the user has used scroll control 1516 on device 1504 in order to increase the maximum weight to over 2 kilograms. The maximum weight change is flowed from the portion of the transformation chain associated with device 1504 to the portion of the transformation chain corresponding to device 1502, resulting in removal of the overweight warnings 1518C and 1518D (overweight warnings 1518A and 1518B remain).

Figure 15K:
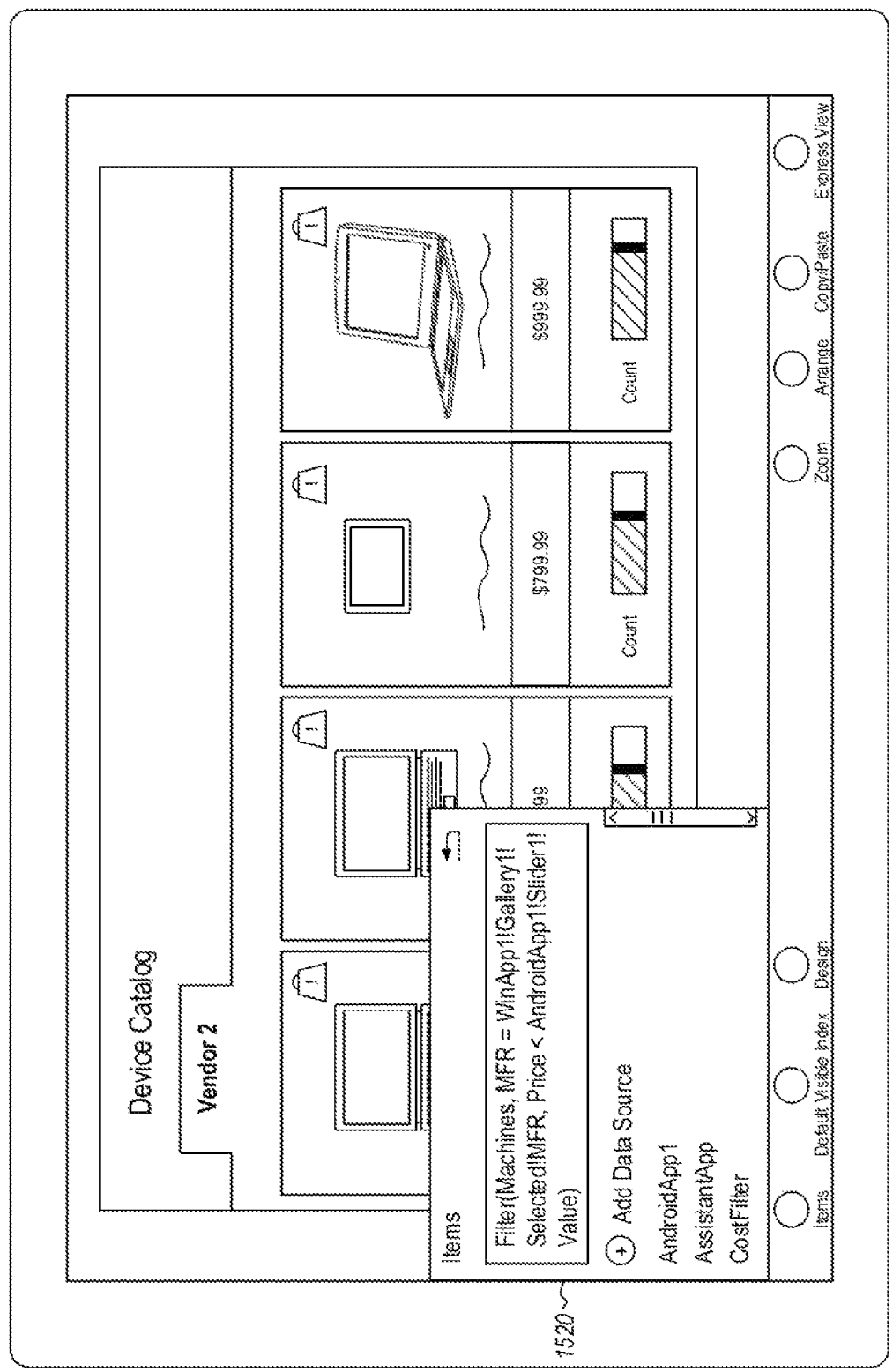
FIGS. 15K through 15O illustrate various user interfaces that may be encountered to change the compound application used in the device scenario of FIGS. 15A through 15J.
Figure 15L:
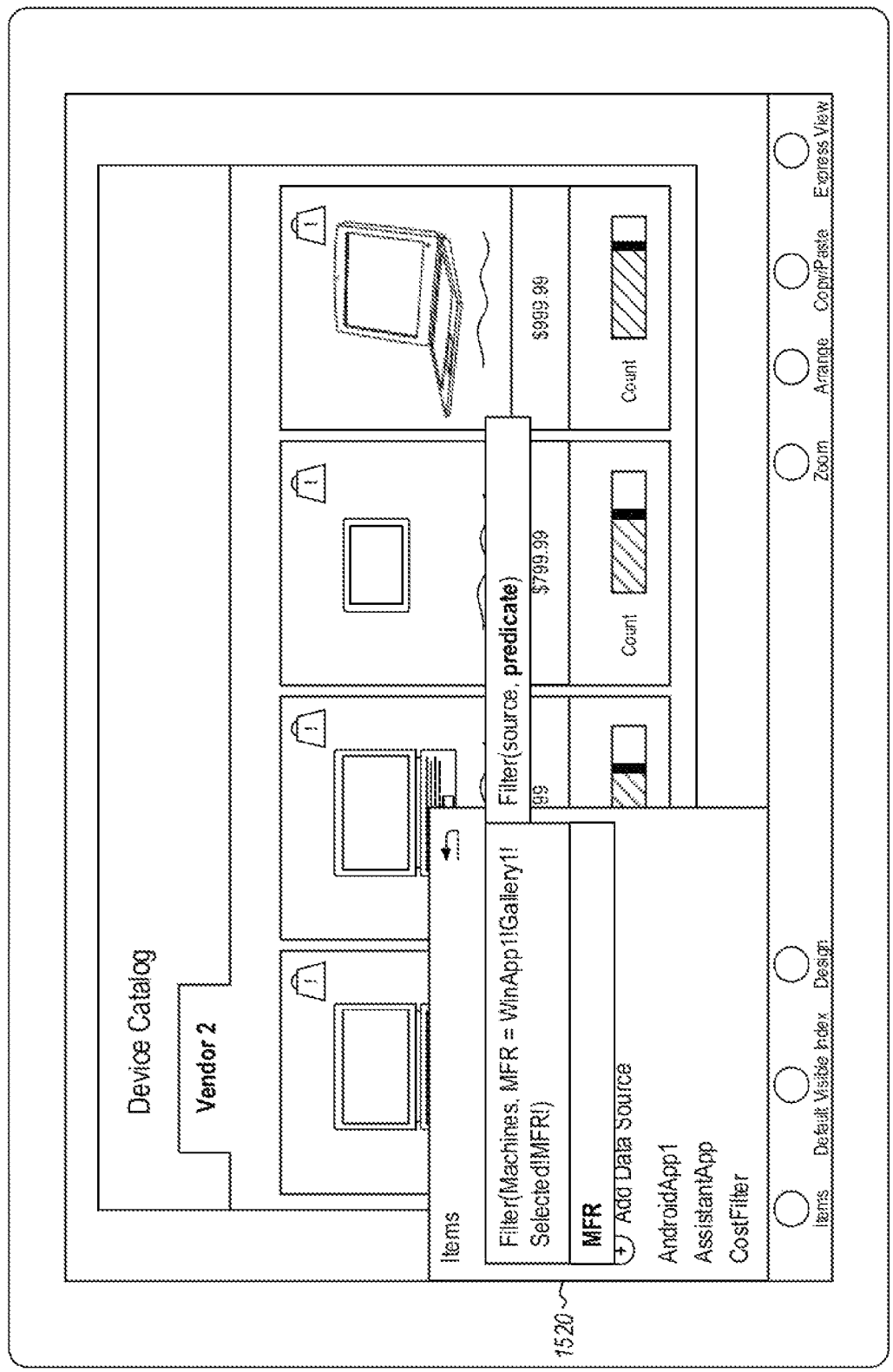

That concludes the scenario from the user perspective. FIGS. 15K through 15O illustrate that at authoring time, the author may declaratively change the transformations to thereby change the functionality of the compound application. In FIG. 15K, the user interface element 1520 is illustrated as including a declarative transformation that filters out those devices that have a suggested manufacturer retail price that is less that the value indicated by slider 1516. FIG. 15L illustrates that this restriction is now removed, and thus the displayed devices are now not filtered out by the value of slider 1516.

Figure 15M:
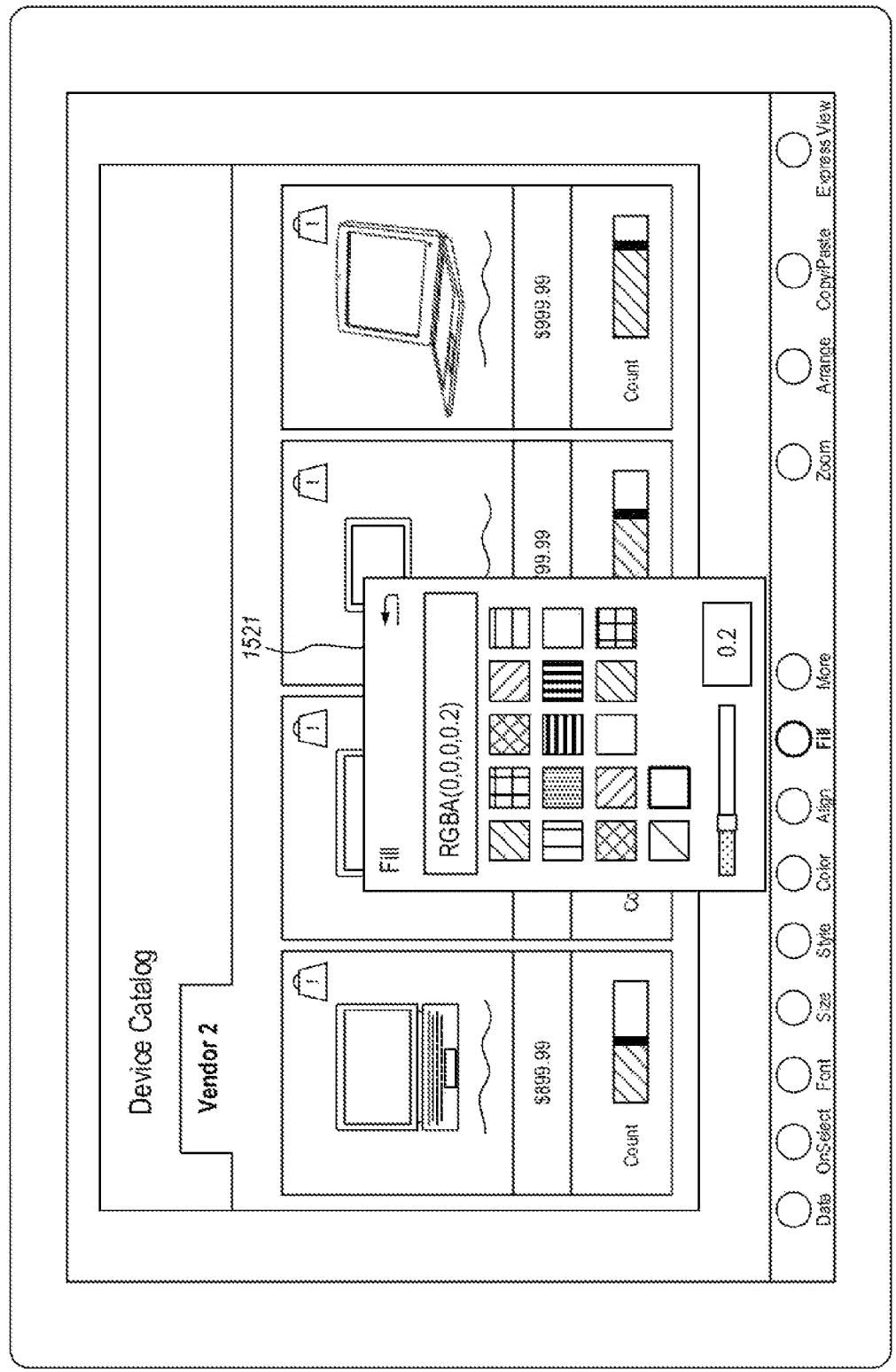
Figure 15N:
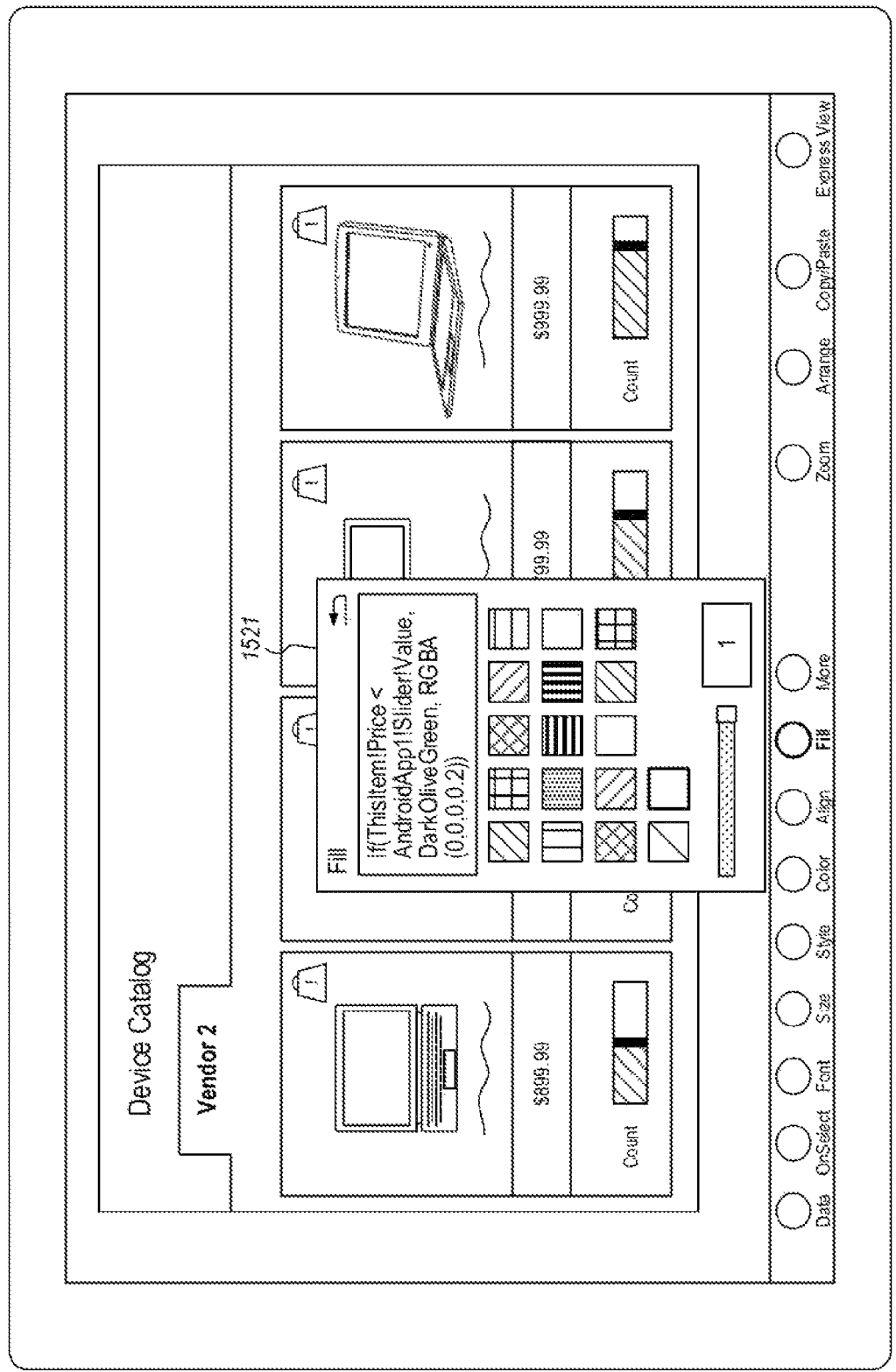
Figure 15O:
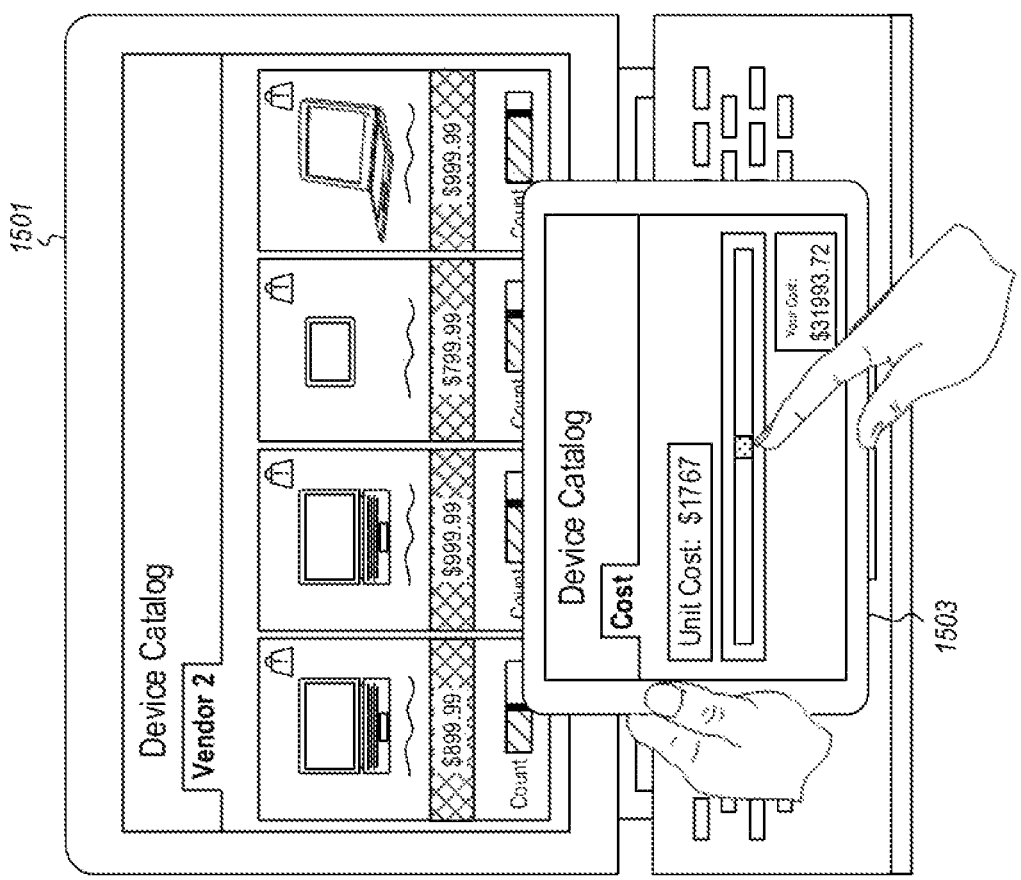

In FIG. 15M, the user interface element 1521 is illustrated as defining a color of highlighting used for the manufactures suggested retail price. FIG. 15N illustrates that the highlighting color now depends on whether or not the manufacturer's suggested retail price is above the value indicated by slider control 1516. If so, the highlighter color changes to, for instance, green. FIG. 15O illustrates that as the slider control 1516 is increased in this situation, the behavior of the compound application has changed from a state in which the devices are removed from the list if their suggested manufacturer retail price is greater than the value of the slider control 1516, to a state in which the manufactures suggested retail price (as compared to the value of slider 1516) drives highlighting of the manufacturer's suggested retail price.

Accordingly, the authorization of the joining and decoupling of transformation chain instances has been described. Such enables compound applications that may change dynamically. For instance, as devices enter and exit a working environment, the compound application may change to adjust to the altering set of available devices. Thus, the compound application may be authored to tailor to the input and output capabilities of the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating a compound application across multiple devices, the method comprising:
    an act of identifying authorized dependencies between a first transformation chain class and a second transformation chain class; and
    an act of authorizing a first instance of the first transformation chain class and a second instance of the second transformation chain class to be joined, wherein joining allows data to flow between the first and second instances in accordance with the identified dependencies between the first transformation chain class and the second transformation chain class and in accordance with dependency state between the first and second instances.

2. The method in accordance with claim 1, further comprising:
    an act of determining that the second instance should be decoupled from the first instance; and
    in response to the act of determining that the second instance should be decoupled from the first instance, an act of discontinuing the act of flowing data between the first and second instances.

3. The method in accordance with claim 2, the act of determining that the first instance and the second instance are to be decoupled being made in accordance with a meeting conclusion status.

4. The method in accordance with claim 2, the first instance associated with a first device, and the second instance associated with a second device.

5. The method in accordance with claim 4, the act of determining that the first instance and the second instance are to be decoupled being made in accordance with one or more decoupling criteria including at least a proximity of the first and second devices.

6. The method in accordance with claim 4, the act of determining that the first instance and the second instance are to be decoupled being made in accordance with one or more decoupling criteria including a communication capability between the first device and the second device.

7. The method in accordance with claim 4, the act of determining that the first instance and the second instance are to be decoupled being made in response to a request from a user of the first device or a user of the second device.

8. The method in accordance with claim 1, the act of determining that the first instance and the second instance are to be joined being made in accordance with one or more joining criteria.

9. The method in accordance with claim 8, the one or more joining criteria including at least a meeting attendee list.

10. The method in accordance with claim 8, the first instance associated with a first device, and the second instance associated with a second device.

11. The method in accordance with claim 10, the one of more joining criteria comprising a proximity status of the first and second devices.

12. The method in accordance with claim 10, the one of more joining criteria comprising a relationship between a user of the first device and a user of the second device.

13. The method in accordance with claim 10, the one of more joining criteria comprising a communication capability between the first device and the second device.

14. The method in accordance with claim 1, the method further comprising:
    an act of identifying authorized dependencies between the first transformation chain class and a third transformation chain class; and
    an act of authorizing the first instance of the first transformation chain class and a third instance of the third transformation chain class to be joined, wherein joining allows data to flow between the first and third instances in accordance with the identified dependencies between the first transformation chain class and the third transformation chain class and in accordance with dependency state between the first and third instances.

15. The method in accordance with claim 14, the method further comprising:
    an act of identifying authorized dependencies between the second transformation chain class and the third transformation chain class; and
    an act of authorizing the second instance of the second transformation chain class and the third instance of the third transformation chain class to be joined, wherein joining allows data to flow between the second and third instances in accordance with the identified dependencies between the second transformation chain class and the third transformation chain class and in accordance with dependency state between the second and third instances.

16. A computer program product comprising one or more computer-readable hardware storage devices having thereon computer-executable instructions that are structured such that, when executed by one or more processors of a computing system, cause the computing system to perform a method for authorizing joining of transformation chain instances of different transformation chain classes, the method comprising:
    an act of identifying authorized dependencies between a plurality of transformation chain classes;
    an act of authorizing a plurality of transformation chain instances to be joined in accordance with one or more joining criteria, the plurality of transformation chain instances representing instances of at least some of the plurality of transformation chain classes;

wherein joining of the plurality of transformation chain instances forms a compound transformation chain instance allows data to flow between at least some of the plurality of transformation chain instances without passing through an application function interface or placing a function call.

17. The computer program product in accordance with claim 16, the method further comprising:
an act of determining that a particular transformation chain instance should be decoupled from compound transformation chain instance in accordance with one or more decoupling criteria; and
in response to the act of determining that the particular transformation chain instance should be decoupled from compound transformation chain instance, an act of discontinuing flowing data to or from the particular transformation chain instance to or from a remainder of the compound transformation chain instance.

18. The computer program product in accordance with claim 17, the one or more decoupling criteria including at least one of the following: a meeting conclusion status, and a proximity of a device associated with the particular transformation chain instance from one or more other devices in an environment.

19. The computer program product in accordance with claim 16, the one or more joining criteria including at least one of the following: a meeting attendee list, a proximity of a device associated with the particular transformation chain instance from one or more other devices in an environment, and a relationship between a user of the particular device and other users in the environment.

20. A computer system, comprising:
one or more processors; and
one or more computer-readable storage media having stored thereon computer-executable instructions that are executable by the one or more processors to cause the computer system to perform a method for authorizing joining of transformation chain instances of different transformation chain classes, and by causing the computer system to perform at least the following:
identify authorized dependencies between a plurality of transformation chain classes; and
authorize a plurality of transformation chain instances to be joined in accordance with one or more joining criteria, the plurality of transformation chain instances representing instances of at least some of the plurality of transformation chain classes;
wherein joining of the plurality of transformation chain instances forms a compound transformation chain instance allows data to flow between at least some of the plurality of transformation chain instances without passing through an application function interface or placing a function call.

* * * * *